United States Patent
Kasuya et al.

(10) Patent No.: US 7,333,609 B2
(45) Date of Patent: Feb. 19, 2008

(54) ENCRYPTING APPARATUS

(75) Inventors: Tomomi Kasuya, Tokyo (JP); Takeshi Chikazawa, Tokyo (JP); Takao Wakabayashi, Tokyo (JP); Shinsuke Uga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 853 days.

(21) Appl. No.: 10/473,879

(22) PCT Filed: Apr. 3, 2001

(86) PCT No.: PCT/JP01/02880

§ 371 (c)(1),
(2), (4) Date: Oct. 2, 2003

(87) PCT Pub. No.: WO02/082715

PCT Pub. Date: Oct. 17, 2002

(65) Prior Publication Data

US 2004/0131186 A1    Jul. 8, 2004

(51) Int. Cl.
H04L 9/00 (2006.01)

(52) U.S. Cl. ............... 380/46; 380/255; 380/29; 380/37

(58) Field of Classification Search ............... 380/46, 380/37, 28, 255, 29; 713/189
See application file for complete search history.

(56) References Cited

U.S. PATENT DOCUMENTS

| 5,060,266 | A | | 10/1991 | Dent |
| 5,444,781 | A | * | 8/1995 | Lynn et al. ............ 380/46 |
| 5,623,548 | A | * | 4/1997 | Akiyama et al. ........ 380/28 |
| 6,408,073 | B1 | | 6/2002 | Hsu et al. |
| 7,177,424 | B1 | * | 2/2007 | Furuya et al. .......... 380/37 |

FOREIGN PATENT DOCUMENTS

| JP | 60-32454 A | 2/1985 |
| JP | 1-163871 A | 6/1989 |
| JP | 2-165186 A | 6/1990 |

(Continued)

OTHER PUBLICATIONS

Alfred J. Menezes, et al., "Handbook of Applied Cryptography", CRC Press, 1997, Chapter 9 Hash Functions and Data Integrity.

(Continued)

Primary Examiner—T. B. Truong
(74) Attorney, Agent, or Firm—Birch, Stewart, Kolasch & Birch, LLP

(57) ABSTRACT

A random number sequence is previously generated by the function f8 for data confidentiality processing, which generates a random number sequence, and stored in a random number sequence memory (buffer). When data (message) is input, the random number sequence stored in the random number sequence memory is obtained, and the data (message) is encrypted by an XOR circuit to generate ciphertext data. In case of decrypting data, a random number sequence is also previously generated by the function f8 for data confidentiality processing and stored in the random number sequence memory (buffer). When the ciphertext data is input, by the XOR circuit, the random number sequence stored in the random number sequence memory is read and the ciphertext data is decrypted into the data (message).

6 Claims, 35 Drawing Sheets

FOREIGN PATENT DOCUMENTS

| | | |
|---|---|---|
| JP | 4-109721 A | 4/1992 |
| JP | 9-22379 A | 1/1997 |
| JP | 10-22994 A | 1/1998 |
| JP | 10-32569 A | 2/1998 |
| JP | 11-355268 A | 12/1999 |
| TW | 424192 B | 3/2001 |
| TW | 494306 | 7/2002 |

OTHER PUBLICATIONS

Daies, D.W. et al, Network Security, Dec. 1985, pp. 105-107.

* cited by examiner

| TLP-U Header 5byte | AMR Header 1byte | Voice ClassA 12byte | Voice ClassB 14byte | Voice ClassC 8byte |

Voice

ENCRYPTING APPARATUS

This application is the national phase under 35 U.S.C. § 371 of PCT International Application No. PCT/JP01/02880 which has an International filing date of Apr. 3, 2001, which designated the United States of America.

TECHNICAL FIELD

This invention relates to an encrypting apparatus, a decrypting apparatus, a message authentication code generating unit, a message authentication code appending unit, and integrity verification unit, and a radio communication apparatus used for devices such as a cellular phone. In particular, the invention relates to data confidentiality and integrity processing.

BACKGROUND ART

FIG. 24 shows a conventional cellular phone 500.

A terminal IF (interface) unit 510, a radio communication control unit 520 and a radio communication unit 530 are provided to the conventional cellular phone 500. The terminal IF unit 510 performs interface with a user of the cellular phone 500. The radio communication control unit 520 performs communication control of the whole cellular phone, data conversion and data processing based on protocol. The radio communication unit 530 modulates and demodulates data to enable radio communication. The radio communication unit 530 supports the physical layer (layer 1), which is the lowermost layer of seven layers defined by OSI (Open Systems Interconnection). A confidentiality processing unit 540 is provided to the radio communication unit 530. The confidentiality processing unit 540 encrypts or decrypts data of the physical layer to be processed by the radio communication unit 530. As the data sent/received by an antenna 541 is encrypted by providing the confidentiality processing unit 540, wiretappers are prevented from obtaining any significant information unless the ecryption codes are broken.

The conventional cellular phone 500 has the confidentiality processing unit 540 within the radio communication unit 530. Accordingly, the data to be processed by the confidentiality processing unit 540 is stored in the physical layer (layer 1). At the physical layer, it is impossible to discriminate data between user data and control data. Data sent/received by the cellular phone includes various kinds of data such as user data or signaling data, and it is required to perform data confidentiality processing based on the data kinds, or to ensure data integrity depending on the significance of the data. As shown in the conventional architecture, since the confidentiality processing unit 540 is provided to the layer 1, the data cannot be performed the confidentiality processing nor the integrity processing based on the data kind because it is impossible to discriminate the data kinds at the layer 1.

Further, the conventional confidentiality processing has been performed by generating a random number sequence synchronously with inputting data and by performing an XOR operation of the data and the random number sequence synchronously with inputting the data.

Yet further, the conventional integrity processing has been performed by generating a message authentication code for each data or checking integrity of the data for each data.

A preferred embodiment of the present invention aims to perform high-speed data confidentiality and integrity processing.

Further, another objective of the preferred embodiment of the present invention is to perform the data confidentiality and integrity processing at a higher layer equal to or greater than layer 2 (data link layer) of the seven layers of the OSI.

Yet further, another objective of the preferred embodiment of the present invention is to perform the data confidentiality and integrity processing without loading on the central processing unit and the bus.

DISCLOSURE OF THE INVENTION

According to the present invention, an encrypting apparatus includes:

an encryptor for generating a random number sequence;

a random number sequence memory for storing the random number sequence generated by the encryptor; and an operating unit for inputting plaintext data, performing an operation of the plaintext data input and the random number sequence stored in the random number sequence memory and outputting ciphertext data, and by previously storing the random number sequence in the random number sequence memory, generation of the random number sequence by the encryptor and the operation of the plaintext data and the random number sequence by the operating unit are performed asynchronously.

The encryptor starts the generation of the random number sequence before the operating unit inputs the plaintext data.

The encryptor inputs at least an encryption key and a length of the plaintext data, generates the random number sequence having the length of the plaintext data using the encryption key, and makes the random number sequence memory store the random number sequence generated, and the random number sequence memory includes a buffer for outputting the random number sequence stored in case that the operating unit inputs the plaintext data.

The operating unit inputs the plaintext data corresponding to plural channels;

the encryptor inputs channel identifying information for identifying a channel and generates the random number sequence for each of the plural channels;

the random number sequence memory stores the random number sequence generated by the encryptor for each of the plural channels; and the operating unit inputs the random number sequence corresponding to each of the plural channels from which the plaintext data is input and encrypts the plaintext data.

According to the present invention, a decrypting apparatus includes:

a decryptor for generating a random number sequence;

a random number sequence memory for storing the random number sequence generated by the decryptor; and an operating unit for inputting ciphertext data, performing an operation of the ciphertext data input and the random number sequence stored in the random number sequence memory, and outputting plaintext data, and by previously storing the random number sequence in the random number sequence memory, generation of the random number sequence by the decryptor and the operation of the ciphertext data and the random number sequence by the operating unit are performed asynchronously.

The decryptor starts the generation of the random number sequence before the operating unit inputs the ciphertext data.

The decryptor inputs at least a decryption key and a length of the ciphertext data, generates the random number sequence having the length of the ciphertext data using the decryption key, and makes the random number sequence memory store the random number sequence generated, and the random number sequence memory includes a buffer for outputting the random number sequence stored in case that the operating unit inputs the ciphertext data.

The operating unit inputs the ciphertext data corresponding to plural channels;

the decryptor inputs channel identifying information for identifying a channel and generates the random number sequence for each of the plural channels;

the random number sequence memory stores the random number sequence generated by the decryptor for each of the plural channels; and the operating unit inputs the random number sequence corresponding to each of the channels from which the ciphertext data is input and decrypts the ciphertext data.

According to the present invention, a message authentication code generating apparatus includes:

a data memory for inputting and storing X (X≧2) pieces of data and data of X control signals; and a message authentication code generating unit for inputting the X pieces of data and the data of X control signals stored in the data memory, generating X message authentication codes corresponding to the X pieces of data, and outputting the X message authentication codes together as a group.

The message authentication code generating apparatus is connected to a central processing unit through a bus;

the data memory inputs the X pieces of data and the data of X control signals together as a group from the central processing unit through the bus; and the message authentication code generating unit outputs the X message authentication codes generated together as a group to the central processing unit through the bus.

According to the present invention, a message authentication code appending apparatus includes:

a data memory for inputting and storing X (X≧2) pieces of data and data of X control signals;

a message authentication code generating unit for inputting the X pieces of data and the data of X control signals stored in the data memory, generating X message authentication codes corresponding to the X pieces of data, and outputting the X message authentication codes together as a group; and a message authentication code appending unit for inputting the X message authentication codes output together as the group by the message authentication code generating unit, appending X message authentication codes to the X pieces of data, and outputting the X pieces of data having the X message authentication codes appended.

According to the present invention, an integrity verification apparatus includes:

a data memory for inputting and storing X (X≧2) pieces of data having X authentication codes appended and data of X control signals;

a message authentication code generating unit for inputting the X pieces of data and the data of X control signals stored in the data memory, generating X message authentication codes corresponding to the X pieces of data, and outputting the X message authentication codes together as a group; and an integrity verification unit for inputting the X message authentication codes output together as the group by the message authentication code generating unit, comparing the X message authentication codes input and the X message authentication codes appended to the X pieces of data to verify integrity of the X pieces of data.

According to the present invention, a radio communication apparatus includes:

a terminal interface unit for inputting data;

a radio communication control unit for inputting the data input by the terminal interface unit and processing the data based on a protocol, and outputting a result of the processing;

a confidentiality processing unit for inputting a control signal and the data from the radio communication control unit, performing confidentiality processing by encrypting the data input based on the control signal input, and outputting the data processed to the radio communication control unit; and a radio communication unit for inputting, modulating, and sending the data output by the radio communication control unit, and the confidentiality processing unit includes:

an encryptor for starting generation of a random number sequence to be used for encrypting the data before the data is input, and outputting the random number sequence generated;

a random number sequence memory for temporarily storing the random number sequence output by the encryptor before the data is input; and an operating unit for inputting the data and encrypting the data by performing an operation of the data input and the random number sequence stored in the random number sequence memory.

According to the present invention, a radio communication apparatus includes:

a terminal interface unit for inputting data;

a radio communication control unit for inputting the data input by the terminal interface unit and processing and outputting the data based on a protocol;

an integrity processing unit for inputting a control signal and the data from the radio communication control unit, performing integrity processing by generating a message authentication code for the data input to detect tampering based on the control signal input, and outputting the data processed to the radio communication control unit; and a radio communication unit for inputting, modulating, and sending the data output by the radio communication control unit, and the integrity processing unit includes:

a data memory for inputting and temporarily storing plural control signals and plural pieces of the data together as a group; and a message authentication code generating unit for generating plural message authentication codes for the plural pieces of data stored in the data memory using the control signal, and outputting the plural message authentication codes together as a group.

According to the present invention, a radio communication apparatus includes:

a radio communication unit for receiving and demodulating data;

a radio communication control unit for inputting the data demodulated by the radio communication unit, and processing and outputting the data based on the protocol;

a confidentiality processing unit for inputting the control signal and the data, performing a confidentiality processing by decrypting data for the data input, and outputting the data processed to the radio communication control unit; and a terminal interface unit for inputting and outputting the data processed by the radio communication control unit, and the confidentiality processing unit includes:

a decryptor for generating and outputting a random number sequence to be used for decrypting the data input before the data is input;

a random number sequence memory for temporarily storing the random number sequence output by the decryptor before the data is input; and an operating unit for inputting the data, performing an operation of the data input and the random number sequence stored in the random number sequence memory, and outputting plaintext data.

According to the present invention, a radio communication apparatus includes:

a radio communication unit for receiving and demodulating data;

a radio communication control unit for inputting the data demodulated by the radio communication unit, and processing and outputting the data based on the protocol;

an integrity processing unit for inputting a control signal and the data from the radio communication control unit, performing integrity processing by generating a message authentication code for the data input to detect tampering based on the control signal input, and outputting the data processed to the radio communication control unit; and a terminal interface unit for inputting and outputting the data processed by the radio communication control unit, and the integrity processing unit includes:

a data memory for inputting and temporarily storing plural control signals and plural pieces of the data together as a group; and a message authentication code generating unit for generating plural message authentication codes for the plural pieces of data stored in the data memory using the control signal, and outputting the plural message authentication codes together as a group.

According to the present invention, an encrypting method includes:

starting generating a random number sequence before inputting plaintext data, and previously storing the random number sequence generated in a random number sequence memory; and inputting the plaintext data after the starting generating the random number sequence, performing an operation of the plaintext data input and the random number sequence previously stored in the random number sequence memory, and outputting ciphertext data.

According to the present invention, a decrypting method includes:

starting generating a random number sequence before inputting ciphertext data, and previously storing the random number sequence generated in a random number sequence memory; and inputting the ciphertext data after the starting generating the random number sequence, performing an operation of the plaintext data input and the random number sequence previously stored in the random number sequence memory, and outputting plaintext data.

According to the present invention, a message authentication code generating method includes:

inputting and storing X (X≧2) pieces of data and data of X control signals in a data memory; and inputting the X pieces of data and the data of X control signals stored in the data memory, generating X message authentication codes corresponding to the X pieces of data, and outputting the X message authentication codes together as a group.

PREFERRED EMBODIMENT OF CARRYING OUT THE INVENTION

Embodiment 1

Figure 1:
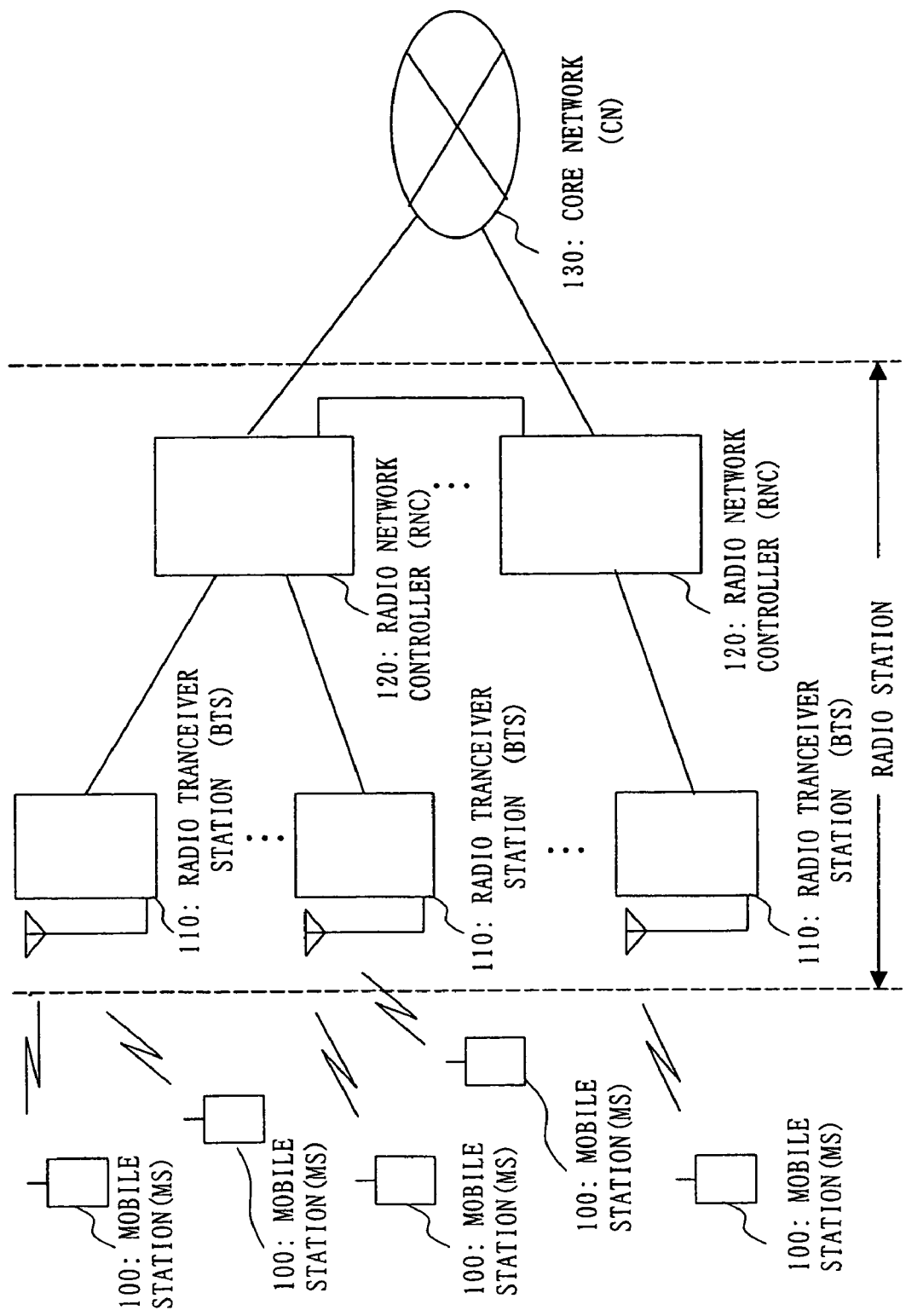
FIG. 1 shows a configuration of a mobile communication system.

FIG. 1 shows a general configuration of a mobile communication system according to this embodiment.

A mobile station (MS) is one example of the radio communication apparatus according to the invention. The mobile station (MS) 100 is, for example, a cellular phone. The mobile station (MS) 100 is connected to a base transceiver station (BTS) 110 by radio. The base transceiver station (BTS) 110 is connected to a radio network controller (RNC) 120. The radio network controller (RNC) 120 is connected to another radio network controller (RNC) 120. The radio network controller (RNC) 120 is also connected to a core network (CN) 130, and further connected to another radio network controller (RNC) 120 via the core network (CN) 130. One or both of the base transceiver station (BTS) 110 and the radio network controller (RNC) 120 can be referred to as a radio station.

Figure 2:
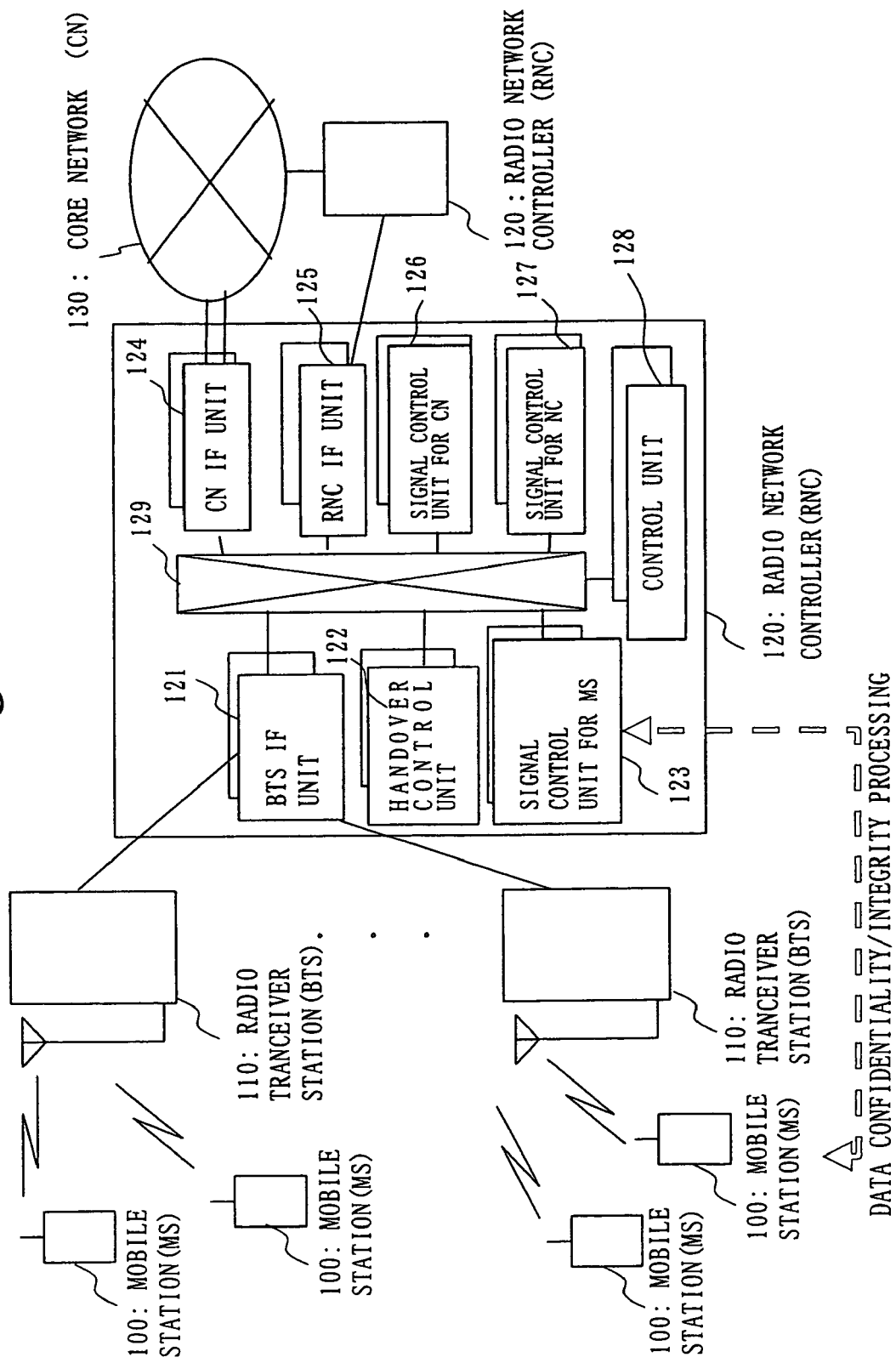
FIG. 2 shows a configuration of a radio network controller (RNC) 120.

FIG. 2 shows a configuration of the same mobile communication system as shown in FIG. 1. In particular, the figure shows the internal configuration of the radio network controller (RNC) 120.

A BTS IF unit 121 connects the base transceiver station (BTS) 110. A handover control unit 122 controls handover in case the mobile station (MS) 100 moves between the base transceiver stations (BTS) 110.

A signal control unit 123 for MS performs radio communication control and data confidentiality/integrity processing while communicating with the mobile station (MS) 100. The following confidentiality/integrity processing of the mobile station (MS) 100 is performed corresponding to the confidentiality/integrity processing of the signal control unit 123 for MS. Namely, data encrypted by the mobile station (MS) 100 is decrypted by the signal control unit 123 for MS. In reverse, the data encrypted in the signal control unit 123 for MS is decrypted in the mobile station (MS) 100. An authentication code appended by the mobile station (MS) 100 to ensure the integrity of data is checked by the signal control unit 123 for MS. In reverse, the authentication code appended by the signal control unit 123 for MS to ensure the integrity of data is checked by the mobile station (MS) 100. The data confidentiality processing or the data integrity processing is performed at the second layer of the seven layers, that is, layer 2 (data link layer). A CN IF unit 124 interfaces with the core network (CN) 130.

A RNC IF unit 125 interfaces with another radio network controller (RNC) 120. A signal control unit 126 for CN performs control with a core network (CN) 130. A signal control unit 127 for RNC performs control with another radio network controller (RNC) 120. A control unit 128 controls the whole radio network controller (RNC) 120. A switch 129 switches control signals and packet data based on the control performance of the control unit 128 among the radio station (BTS) 110, the radio network controller (RNC) 120 and the core network (CN) 130. Namely, the switch 129 switches not only the packet data, but all data kinds such as speech data, and further the switch 129 also switches the control signals.

Figure 3:
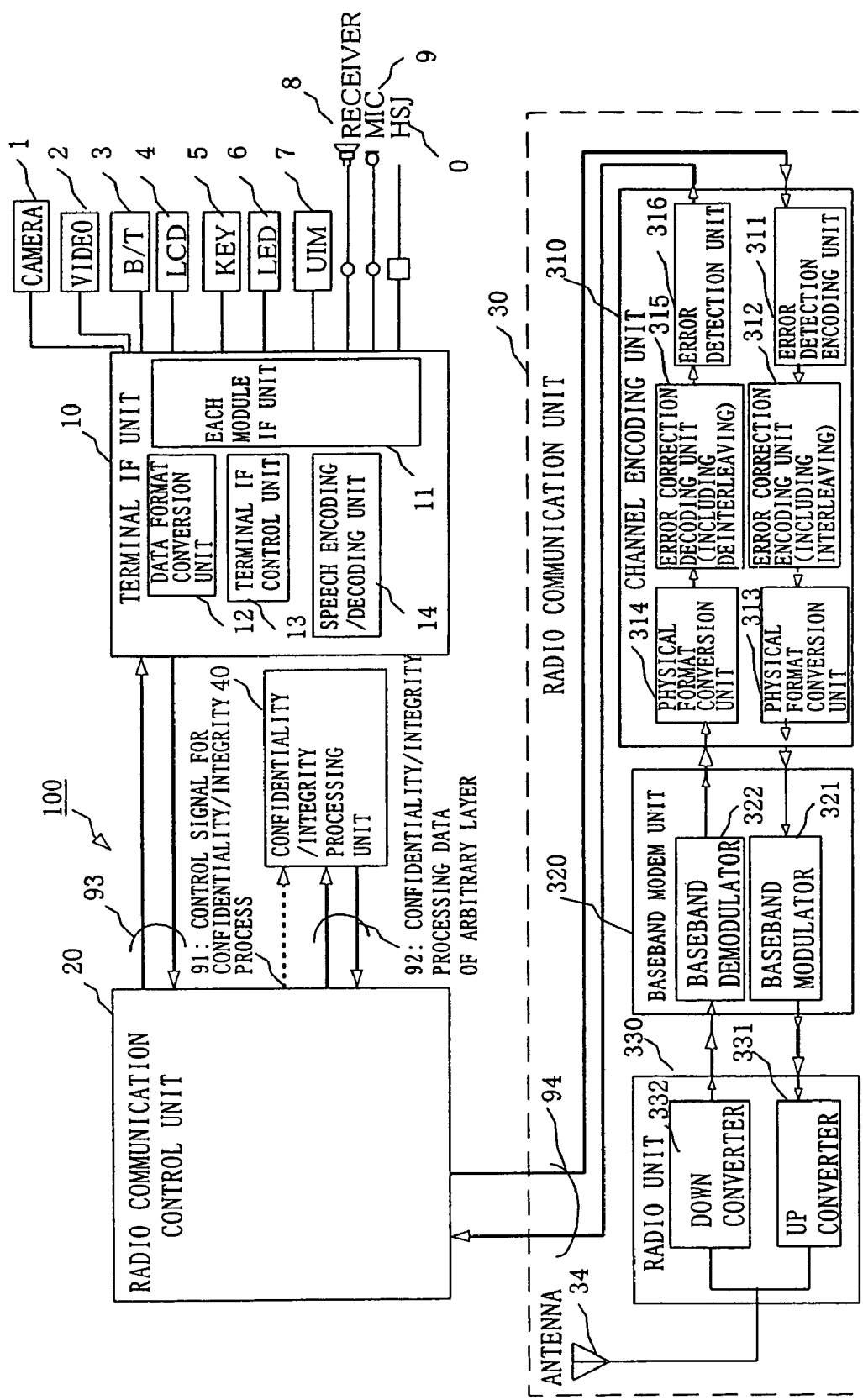
FIG. 3 shows a configuration of a mobile station (MS) 100 according to the first embodiment.

FIG. 3 shows a configuration of the mobile station (MS) 100.

The mobile station (MS) 100 includes a terminal IF unit 10, a radio communication control unit 20, a radio communication unit 30 and a confidentiality/integrity processing unit 40. A camera 1, a video 2, B/T (Blue Tooth) 3, an LCD 4, a KEY 5, an LED 6, a USIM (Universal Subscriber Identity Module) 7, a RECEIVER 8, a MIC 9, and an HSJ (Head Set Jack) 0 are connected to the terminal IF unit 10. These devices of the camera 1 through the HSJ 0 perform interface processing with a user (a person) or a device to be connected, and the devices input or output information which can be recognized by the user (person) or the device to be connected.

The terminal IF unit 10 includes a module IF unit 11 for each module, a data format converter 12, a terminal IF control unit 13, and a speech encoding/decoding unit 14. The module IF unit 11 for each module interfaces with each of the devices of the camera 1 through the HSJ 0. The data format converter 12 converts the data formats processed by the devices of the camera 1 through the HSJ 0 to/from the data formats processed inside the mobile station (MS) 100. The terminal IF control unit 13 controls the operation of the terminal IF unit 10. The speech encoding/decoding unit 14 encodes speech electric signals input by the MIC 9 into speech code. Further, the speech encoding/decoding unit 14 decodes the encoded signals to output the speech electric signals to the RECEIVER 8.

The radio communication control unit 20 controls the whole mobile station (MS) 100. The radio communication control unit 20 is provided with a hardware circuit including a CPU, a ROM, a RAM, a firmware, and the like, or software module. The radio communication control unit 20 processes data between the terminal IF unit 10 and the radio communication unit 30. The radio communication control unit 20 converts data based on rules defined by the standard or the protocol. In particular, the radio communication control unit 20 processes data of layer 2 or upper levels of layer, by such functions as packeting or concatenating the data. The radio communication control unit 20 can discriminate the data kind, because the radio communication control unit 20 processes the data of layer 2 or upper. Accordingly, the radio communication control unit 20 can judge if certain data should undergo the confidentiality processing or the integrity processing based on the data kind. It is impossible to discriminate the data kind at the layer 1, and therefore it is impossible to judge whether the data should be performed the confidentiality processing or the integrity processing.

The radio communication unit 30 is provided with a channel encoding unit 310, a baseband modulating/demodulating unit 320, a radio unit 330, and an antenna 34. The channel encoding unit 310 includes encoding units and decoding units for respective channels. The encoding unit includes an error detection encoding unit 311, an error correction encoding unit 312, and a physical format converter 313. Further, the decoding unit includes a physical format converter 314, an error correction decoding unit 315, and an error detection unit 316. The baseband modulating/demodulating (MODEM) unit 320 modulates and demodulates the band. The baseband modulating/demodulating unit 320 includes a baseband modulator 321 and a baseband demodulator 322. The radio unit 330 converts the baseband signals into transmission spectrum, or reverse the conversion. The radio unit 330 includes an up-converter 331 and a down-converter 332.

The confidentiality/integrity processing unit 40 is connected to the radio communication unit 20. The confidentiality/integrity processing unit 40 receives data from the radio communication control unit 20 and performs the data confidentiality processing. Further, the confidentiality/integrity processing unit 40 ensures the integrity of the data. The confidentiality/integrity processing unit 40 inputs a control signal 91 from the radio communication control unit 20 for the data confidentiality/integrity processing. Further, the confidentiality/integrity processing unit 40 inputs data 92 of an arbitrary layer of 2 or upper levels of layer as the processing data of the confidentiality processing and/or data 92 of an arbitrary layer of 2 or upper levels of layer as the processing data of the integrity processing from the radio communication control unit 20. The confidentiality/integrity processing unit 40 performs the confidentiality processing and/or the integrity processing of the data 92 based on the input control signal 91 to output to the radio communication control unit 20. The control signal 91 includes parameters such as a key, an initial value, selection between the confidentiality processing and the integrity processing.

Figure 4:
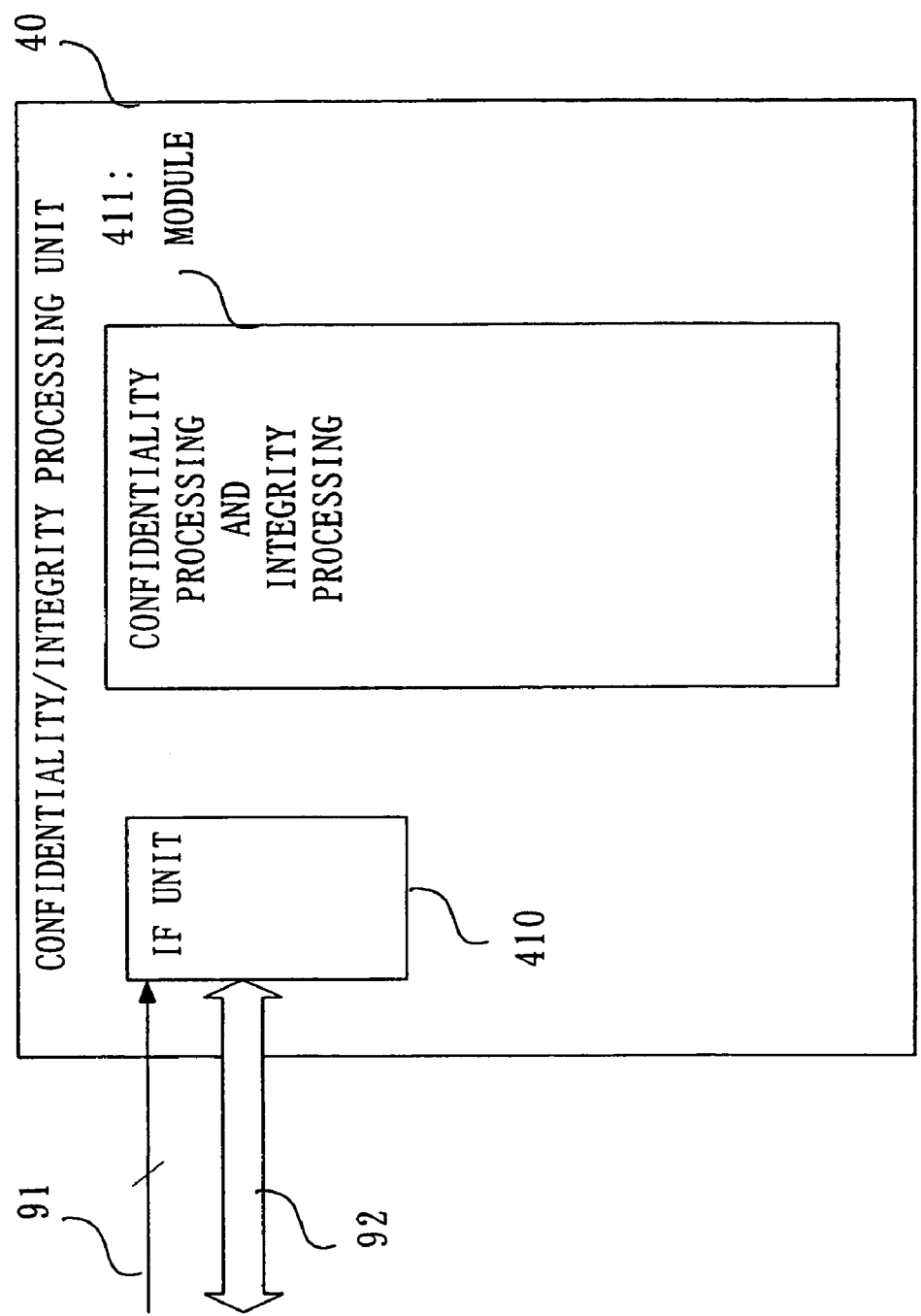
FIG. 4 shows a configuration of a confidentiality/integrity processing unit 40 according to the first embodiment.

FIG. 4 shows a configuration of the confidentiality/integrity processing unit 40.

The confidentiality/integrity processing unit 40 includes an IF unit 410 and a module 411. The module 411 performs the confidentiality processing and the integrity processing within the same circuit or using the same algorithm. The selection between the confidentiality processing and the integrity processing is determined by the control signal 91.

Here, the confidentiality processing means encrypting or decrypting the data. Further, the integrity processing means detecting data tampering by appending authentication codes to the data or reproducing and comparing the authentication codes.

The confidentiality processing and the integrity processing can be performed by the same circuit or algorithm, or by a similar circuit or a similar module. Accordingly, as shown in FIG. 4, the confidentiality processing and the integrity processing can be performed by a single module 411. In case of FIG. 4, it is possible to reduce the hardware resource and the software resource. Hereinafter, a "module" refers to the ones implemented either by hardware or software only, or by combining the both tools.

Here, concrete examples of the confidentiality processing and the integrity processing used for the cellular phone will be explained.

Figure 14:
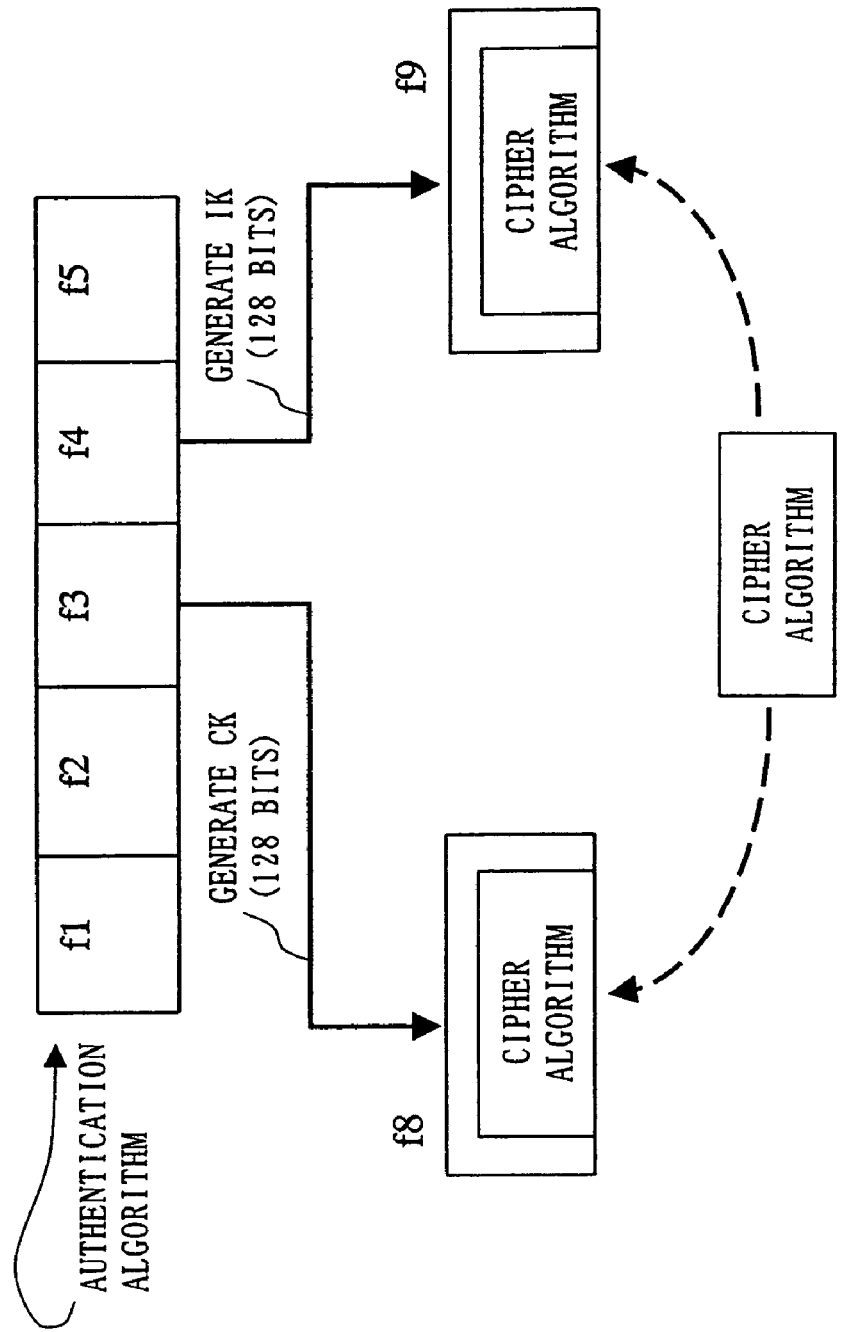
FIG. 14 is an illustration shown in ARIB STD-T63 33.102,3G Security; Security Architecture, Section 6.3.

FIG. 14 is a figure shown in ARIB STD-T63 33.102,3G Security; Security Architecture, Section 6.3.

Figure 15:
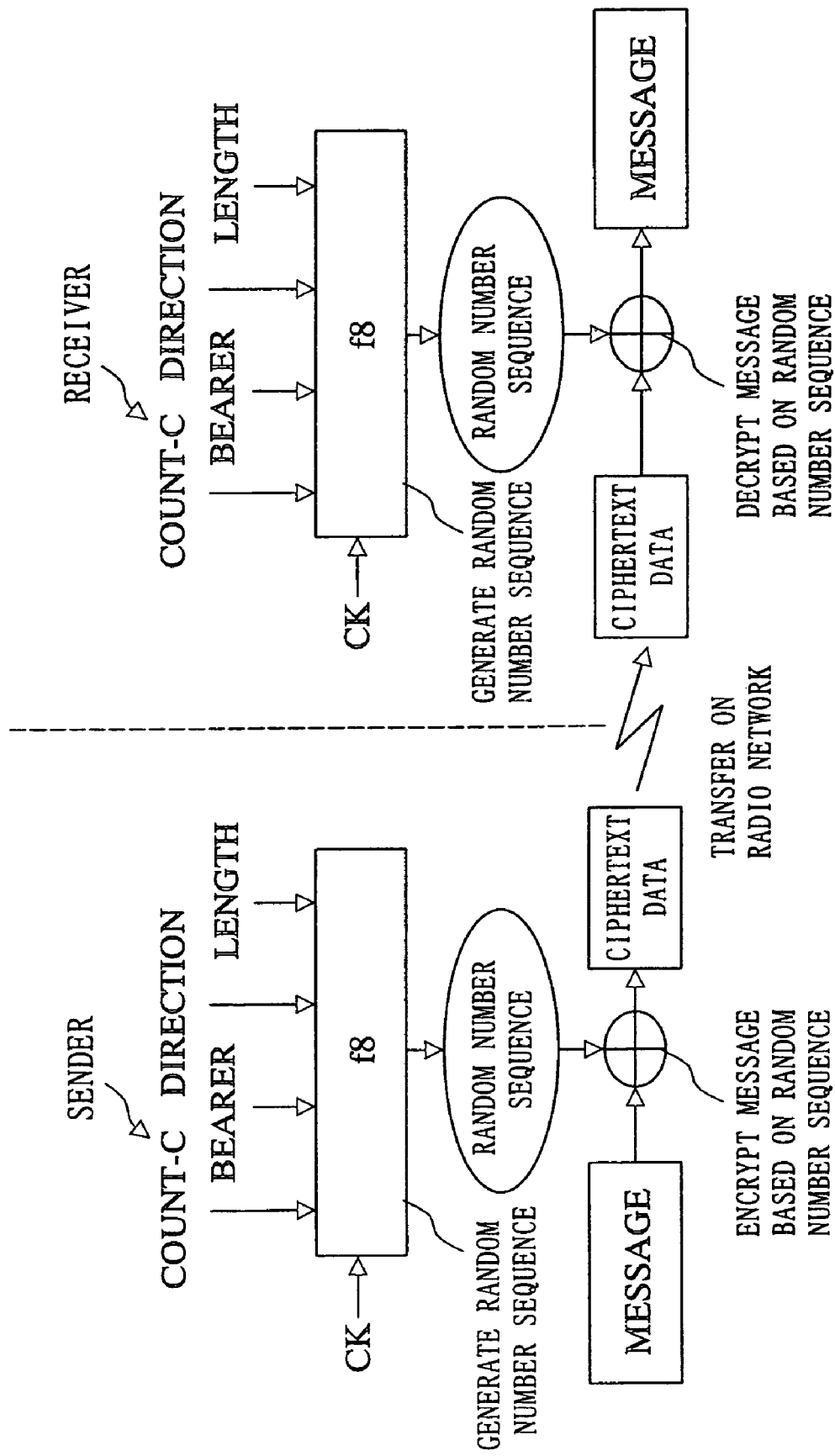
FIG. 15 is an illustration shown in ARIB STD-T63 33.102,3G Security; Security Architecture, FIG. 16b.

FIG. 15 is a figure shown in ARIB STD-T63 33.102,3G Security; Security Architecture, FIG. 16*b*.

Figure 16:
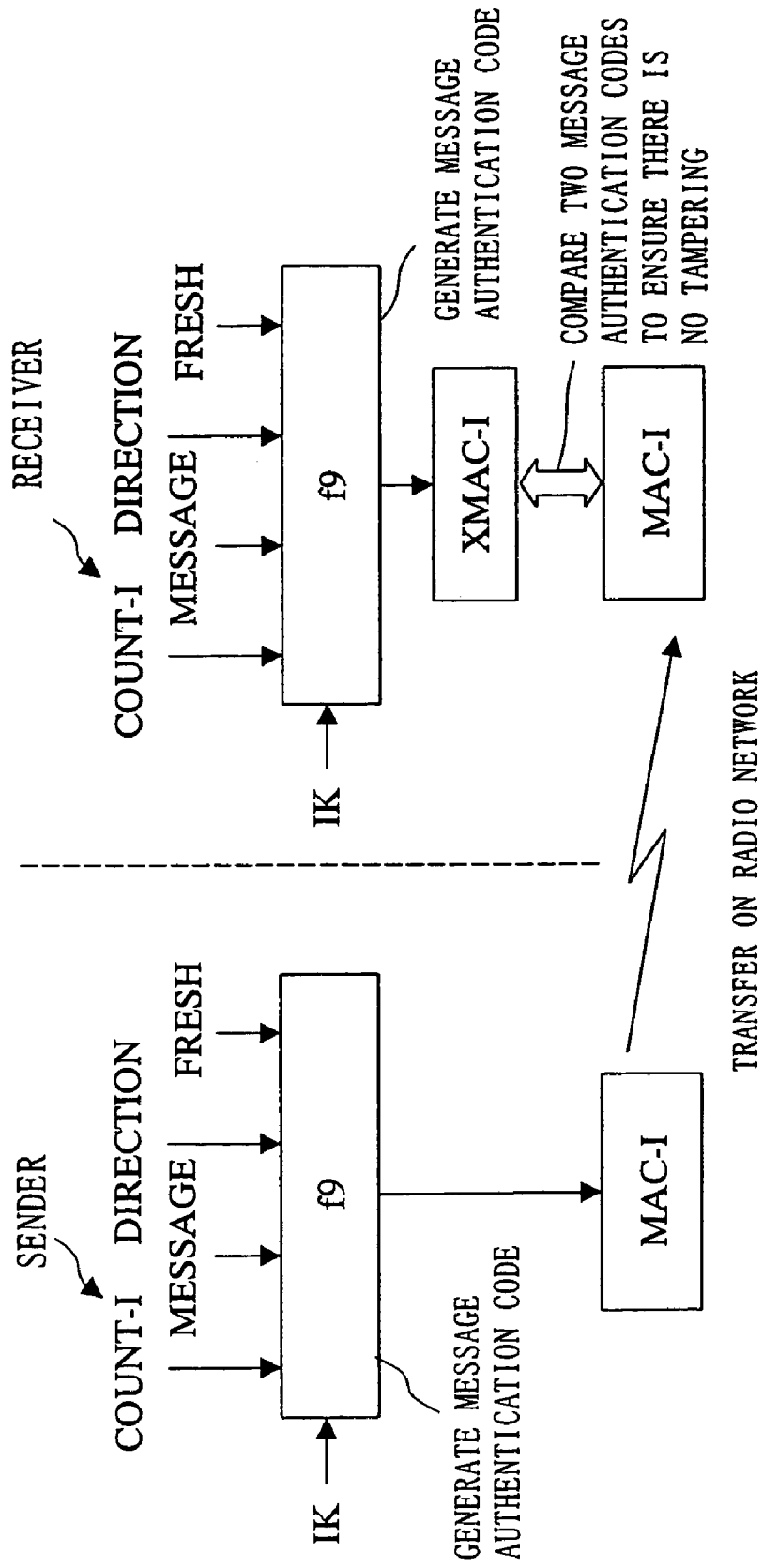
FIG. 16 is an illustration shown in ARIB STD-T63 33.102,3G Security; Security Architecture, FIG. 16.

FIG. 16 is a figure shown in ARIB STD-T63 33.102,3G Security; Security Architecture, FIG. 16.

FIG. 14 shows an encrypting method on the radio line. Signs shown in FIG. 14 mean the following:

CK: cipher key (encryption key)

F8: function for data confidentiality processing

IK: integrity key (message authenticating key)

F9: function for data integrity processing

Cellular phone carriers implement authentication using functions f1 through f5. The 128-bit encryption keys called CK and IK generated through this authentication process are transferred to the function for data confidentiality processing (f8) and the function for data integrity processing (f9).

FIG. 15 shows an encrypting method on the radio line. The signs shown in FIG. 15 mean the following:

f8: function for data confidentiality processing

CK: cipher key (encryption key)

MESSAGE: plaintext data which a sender wants to send to a receiver such as user data and signal information before encryption COUNT-C: numeral value data showing the accumulated number of transmission/reception, incremented by 1 at each session.

BEARER: bit for identifying logical channel

DIRECTION: bit for discriminating the direction of transmission of ciphertext

LENGTH: bit length of MESSAGE or ciphertext data

As shown in FIG. 15, encryption/decryption of the data is performed based on a random number sequence generated by the function f8 for data confidentiality processing.

FIG. 16 shows a method for generating message authentication code. Signs shown in FIG. 16 mean the following:

f9: function for data integrity processing

IK: integrity key (message authenticating key)

COUNT-I: numeral value data showing the accumulated number of transmission/reception, incremented by 1 at each session MESSAGE: plaintext data which a sender wants to send to a receiver such as user data and signal information before encryption DIRECTION: bit for discriminating the direction of transmission FRESH: random number generated for each user MAC-I: message authentication code for integrity (message authentication code computed by the sender)

XMAC-I: expected message authentication code for integrity (message authentication code computed by the receiver).

As shown in FIG. 16, the integrity of the data can be checked by comparing two message authentication codes at the receiver side.

In the following, the operation will be explained.

To perform ciphered communication between the terminal and the network within the radio network, authentication process is required, in which one partner confirms the other is a proper partner, or both partners mutually confirm the other is proper before sending/receiving data between the two partners.

As shown in FIG. 14, during a series of authentication processes, both the terminal and the network use five functions named functions f1 through f5. In parallel with the authentication process, the function generates a cipher key (CK) of 128 bits and a message authentication key (integrity key, IK) at both the terminal and the network.

The two keys can be shared exclusively by the terminal and the network which have been mutually authenticated, and the two keys are used within the two functions f8 and f9 described below. The two keys vary for each communication session, and further, there are no patterns among keys generated. Then, the keys are discarded when the communication is over.

The mechanism (protocol) required for this authentication process is standardized. However, as the functions of f1 to f5 are not standardized, operators decide these functions independently.

The data security after authentication processing is maintained by the data confidentiality and integrity processing techniques.

The first, data confidentiality technique is applied to encrypt the user data and the signal information including speech transferred on the radio network, and for preventing wiretapping. To implement this data confidentiality processing, a function called data confidentiality function (hereinafter, referred to as f8) is employed.

In the case of communicating data which has undergone confidentiality processing as shown in FIG. 15, the sender uses the encryption key (CK) generated at authentication process. Further, a random number sequence is generated by inputting a bit length (LENGTH) of the target data for encryption/decryption, an up/down link (DIRECTION), a counter (COUNT-C), a logic channel identifier (BEARER) to f8.

Here, the up/down link means those distinguishing bits which indicates the transmission direction of ciphertext data between a terminal and a base station. Further, the counter is data showing the number of accumulated times of sending/receiving data. At each sending/receiving the data, a fixed value is added to the counter. The counter is used for preventing an attack which tries to send the ciphertext data that has been sent previously. Yet further, the logic channel identifier means a bit for identifying a logical channel performing encryption.

Ciphertext data is generated by XORing the random number sequence generated above and the data/signal information to be encrypted and sent to the receiver.

The parameters except CK are sent from the sender to the receiver without encryption. It is unnecessary to send CK because the same parameter is generated at the receiver side at authentication process.

Even if the parameters other than CK are obtained by the third party, the security of the original message can be kept, as the random number sequence required to decrypt the ciphertext data cannot be generated as long as CK remains secret.

At the receiver side, the random number sequence is generated using the received parameters and CK which has been already obtained, the random number sequence is XORed with the ciphertext data received to decrypt into the original message.

This method is a variation of OFB (output feedback) mode, which is one of the modes utilizing the block cipher defined by ISO/IEC10116. In OFB mode, even if noise generated on the transmission paths is mixed in the ciphertext data, the decode processing can prevent the noise part from increasing. For this reason, this mode is often adopted for radio voice communication.

The second technique for keeping the security of data is data integrity technique, which detects tampering in the signal information by appending a message authentication code (message authentication code) to the signal information on the radio communication line. This is also called message authentication technique. To implement this data integrity technique, a function for data integrity (hereinafter, referred to as f9) is used. The same encryption algorithm as F8 is employed in the core part of f9.

First, on authentication, the message authentication key (IK) is derived from the function f4 for generating the message authentication key, and the message authentication key is transferred to f9. As shown in FIG. 16, a message authentication code (MAC-I or XMAC-I) is generated by inputting the data (MESSAGE), the up/down link (DIRECTION), the counter (COUNT-C), the random number (FRESH) generated for each user as well as the message authentication key.

These parameters are also sent to the receiver by using an area of data format which is not encrypted by the sender. Even if the parameters are obtained by the third party, the confidentiality of the data can be kept as long as the message authentication key (IK) is kept secret, which is the same as the case of data confidentiality.

The sender sends the data with appending this message authentication code (MAC-I) appended to the receiver. The receiver, similarly, computes the message authentication code (XMAC-I) by using f9. It can be confirmed there is no tampering by comparing MAC-I and XMAC-I to find them identical.

Here, the following shows some examples of subsequent process in case of tamper detection:

(1) Request the retransmission of the data and check if the received message authentication code is proper or not.
(2) Disconnect the connection in case of consecutive tamper detection.

According to 3GPP specification (for more information, access http://www.3gpp.org/About_3GPP/3gpp.htm), the encryption/decryption module has the function to encrypt the input plaintext data (data to be encrypted) into the ciphertext data (encrypted data) and output the ciphertext data, and the function to decrypt the ciphertext data into the plaintext data and output the plaintext data. Assuming the embodiment is compliant to the 3GPP specification, the above COUNT/BERARER/DIRECTION/CK/LENGTH correspond to the control signal 91 shown in FIG. 3 as concrete examples.

Figure 21:
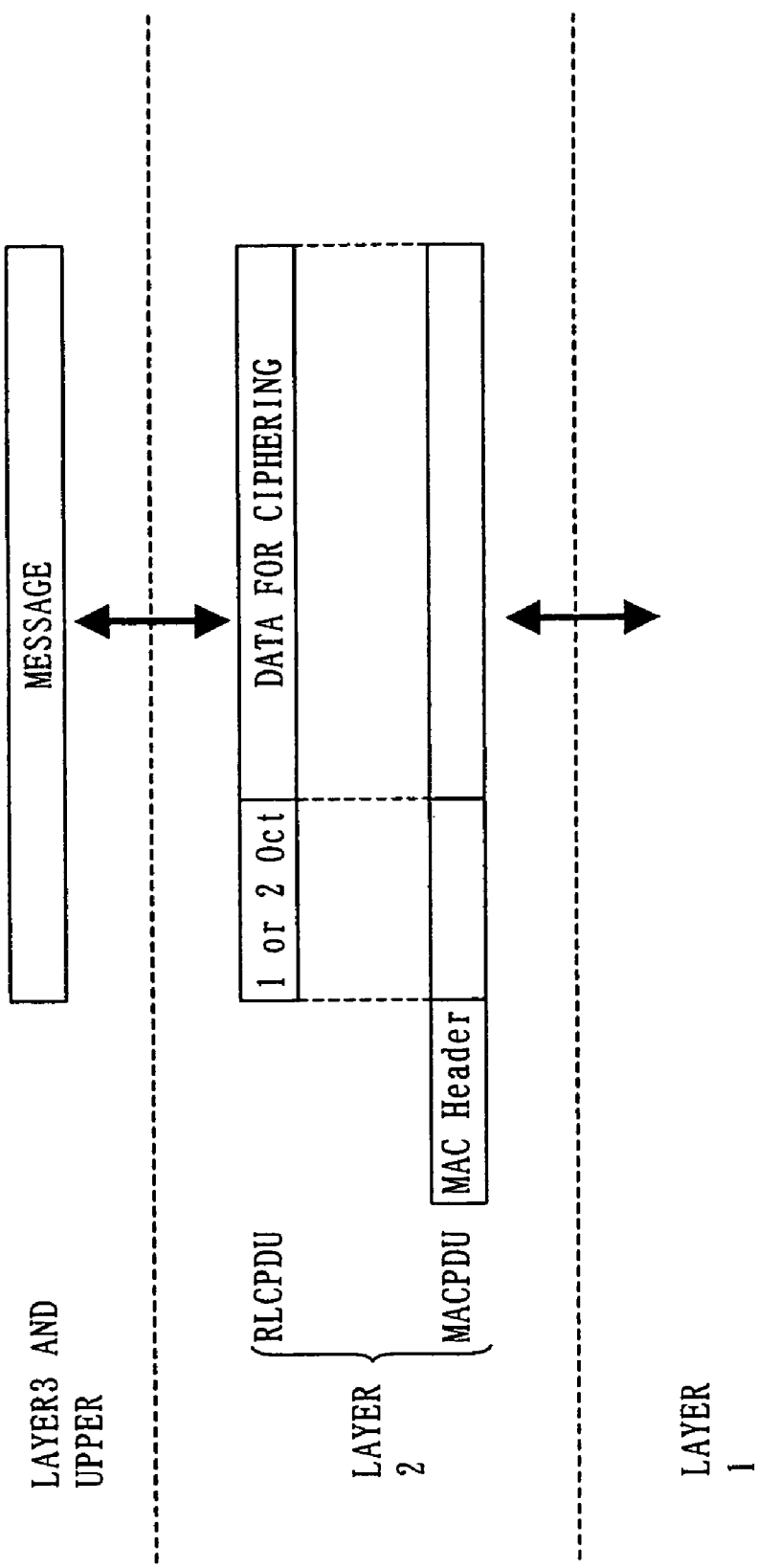
FIG. 21 shows a concrete example of data 92, 93 in case of RLC non-transparent mode.

Further, as for concrete examples of the data 92 and 93 shown in FIG. 3, for example, "MACSDU" or "RLCPDU (datapart)" corresponds as shown in FIG. 21. Here, "RLCSDU (datapart)" is a part of RLCPDU, from which the upper 1 Oct or 2 Octs (1 byte or 2 bytes) is deleted (the part of "DATA FOR CIPHERING" shown in FIG. 21). "MACSDU" or "RLCPDU (datapart)" is an example of MESSAGE shown in FIG. 15. Yet further, MACSDU denotes Media Access Control Service Data Unit. RLCPDU denotes Radio Link Control Protocol Data Unit. Each message within the message flow is structured from RLCPDU at the layer 3 after deleting RLC header.

Although RLCPDU has 1-Oct or 2-Oct part which is not subjected to confidentiality processing, all of the RLCPDU is input to the confidentiality/integrity processing unit 40 and the unit opt not to perform confidentiality/integrity processing on the 1-Oct or 2-Oct part. This is in order to reduce the load of the radio communication control unit 20 wherein the load is generated by shifting 1 Oct or 2 Oct for removing the excluded part of 1 Oct or 2 Oct from the all data unit (RLCPDU).

Figure 5:
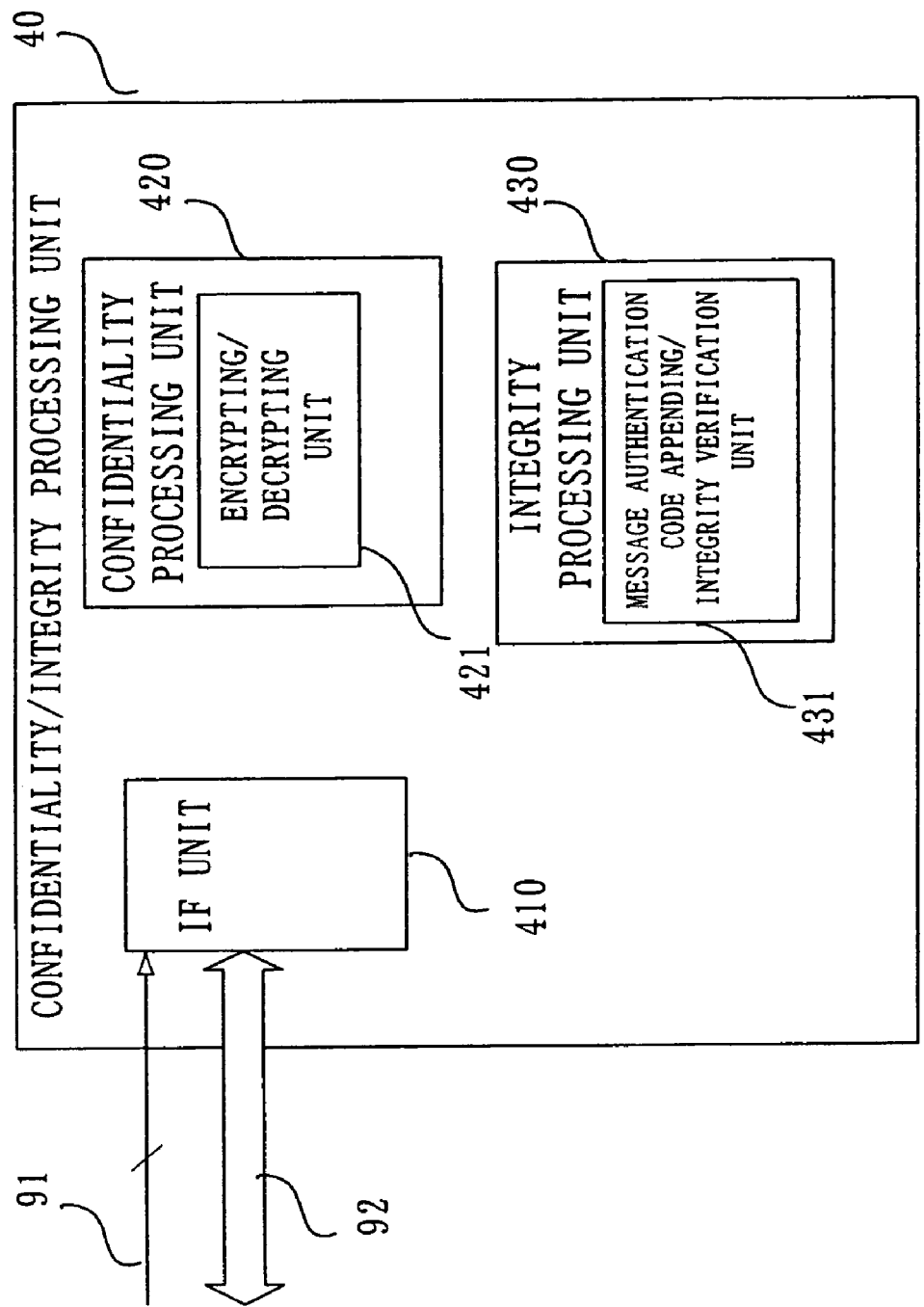
FIG. 5 shows a configuration of a confidentiality/integrity processing unit 40 according to the first embodiment.

FIG. 5 shows another example of the confidentiality/integrity processing unit 40.

As featured in FIG. 5, a confidentiality processing unit 420 and an integrity processing unit 430 are provided separately. Inside the confidentiality processing unit 420, an encrypting/decrypting unit 421 is provided. Inside the integrity processing unit 430, a message authentication code appending/integrity verification unit 431 is provided. The enrypting/decrypting unit 421 shows a case in which the encryption and the decryption are performed using an identical module. The message authentication code appending/integrity verification unit 431 shows a case in which appending the message authentication code and verifying the integrity are performed using an identical module. A case shown in FIG. 5 is a configuration in which the encryption and the decryption are performed by the same function or appending the message authentication code and verifying the integrity are performed by the same function. Compared with FIG. 6, it is possible to reduce the hardware resource and the software resource within the case of FIG. 5.

Figure 6:
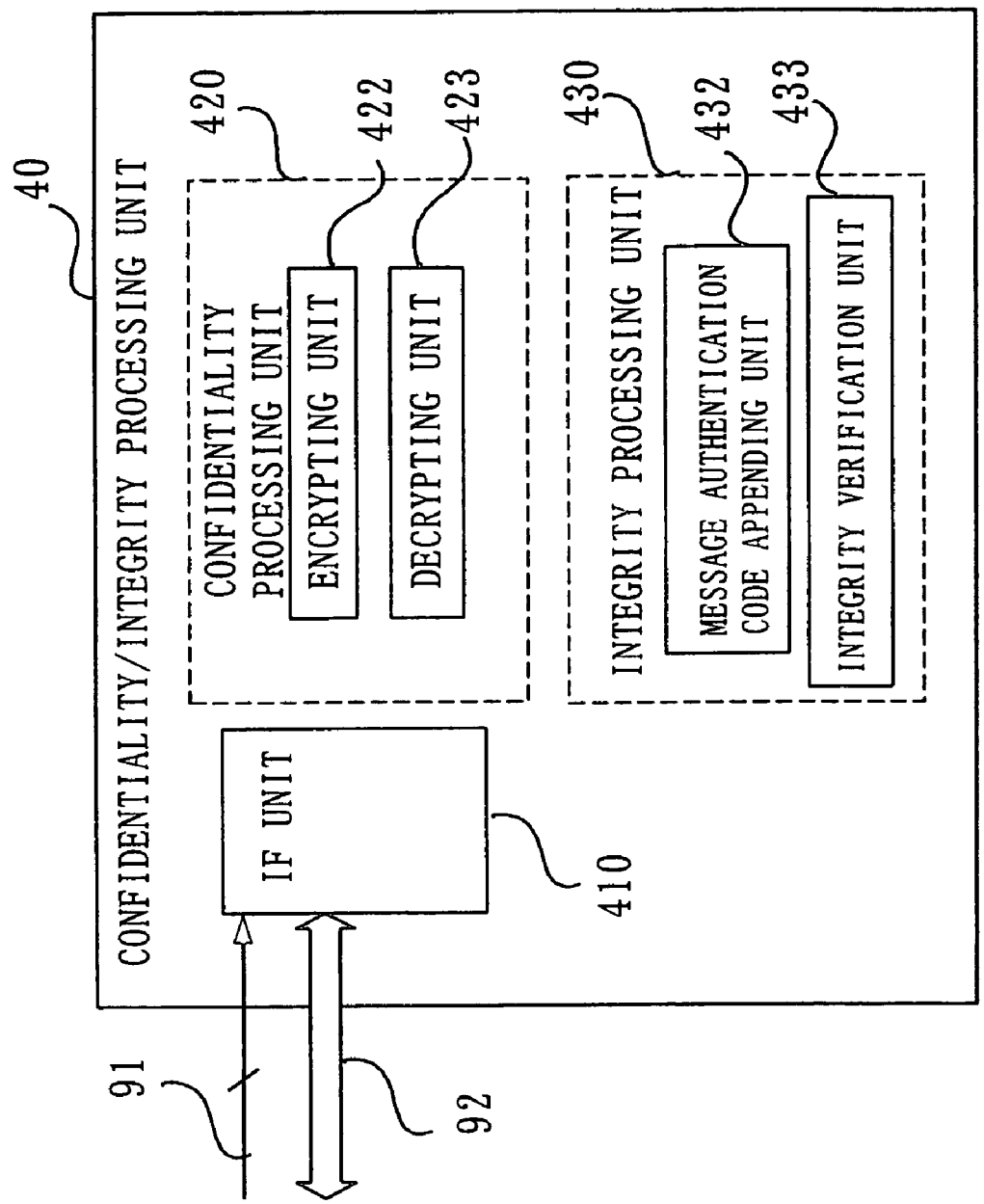
FIG. 6 shows a configuration of a confidentiality/integrity processing unit 40 according to the first embodiment.

FIG. 6 shows another example of the confidentiality/integrity processing unit 40.

As featured in FIG. 6, inside the confidentiality processing unit 420, an encrypting unit 422 and a decrypting unit 423 are provided separately. Further, inside the integrity processing unit 430, a message authentication code appending unit 432 and an integrity verification unit 433 are provided separately. A case shown in FIG. 6 is a configuration in which the encryption and the decryption are performed by different functions or appending the message authentication code and verifying the integrity are performed by different functions. It is possible to respectively perform encrypting, decrypting, appending the message authentication code, verifying the integrity, and further the data confidentiality processing or the integrity processing can be simultaneously performed in parallel on sent/received data. Accordingly, the high speed processing can be done.

Figure 7:
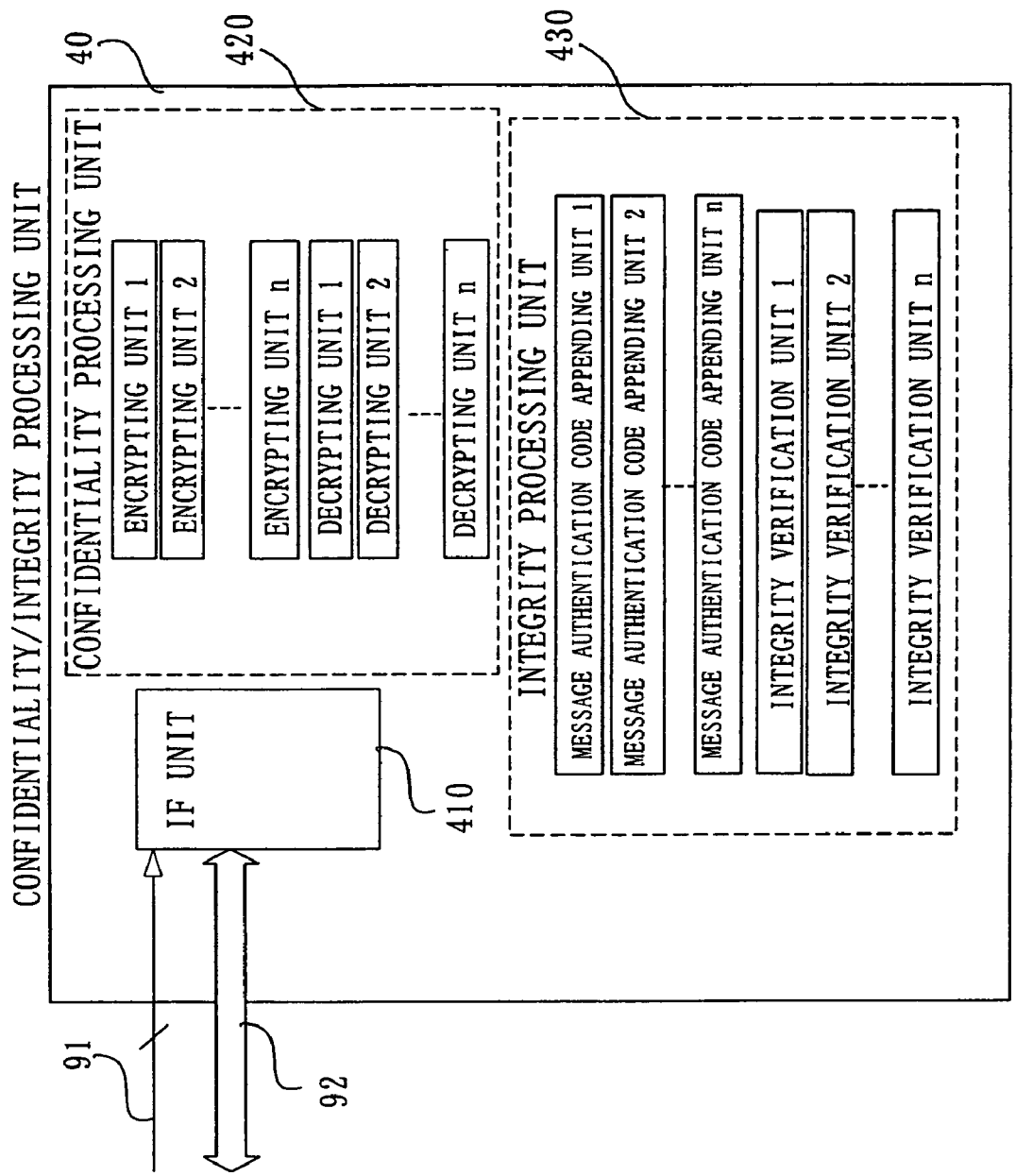
FIG. 7 shows a configuration of a confidentiality/integrity processing unit 40 according to the first embodiment.

FIG. 7 shows a case in which multiple encrypting units 422 and multiple decrypting units 423 are provided in the confidentiality processing unit 420. Further, as shown in the figure, multiple message authentication code appending units 432 and multiple integrity verification units 433 are provided in the integrity processing unit 430. While the mobile station (MS) 100 is operating, there may be a case in which data in multiple channels should be processed at the same time. For example, when two kinds of data such as speech data and facsimile data are simultaneously transferred, data of at least two channels should be simultaneously processed. In such a case, the speech data can be encrypted by the encrypting unit 1, and the facsimile data can be encrypted by the encrypting unit 2. Further, in case of decryption, data on multiple channels can be decrypted simultaneously. It is not necessary to have the same number (n in case of FIG. 7) of the encrypting units 422, the decrypting units 423, the message authentication code appending units 432, and the integrity verification units 433. The number of each units can be determined according to the number of channels to be processed simultaneously by the mobile station (MS) 100. In another way, the above units do not correspond to each channel, but when a certain channel needs to process a large amount of data at a high speed, it is possible to make two encrypting units process the large amount of data assigned to the channel. Namely, the number of each unit such as the encrypting unit 422, the decrypting unit 423, the message authentication code appending unit 432, and the integrity verification unit 433 can be determined according to the number of channels to be processed simultaneously and/or amount of data.

Further, the maximum number of the encrypting units 422 and the maximum number of the decrypting units 423 can be different.

Further, the maximum number of the message authentication code appending units 432 and the maximum number of the integrity verification units 433 can be different.

Figure 8:
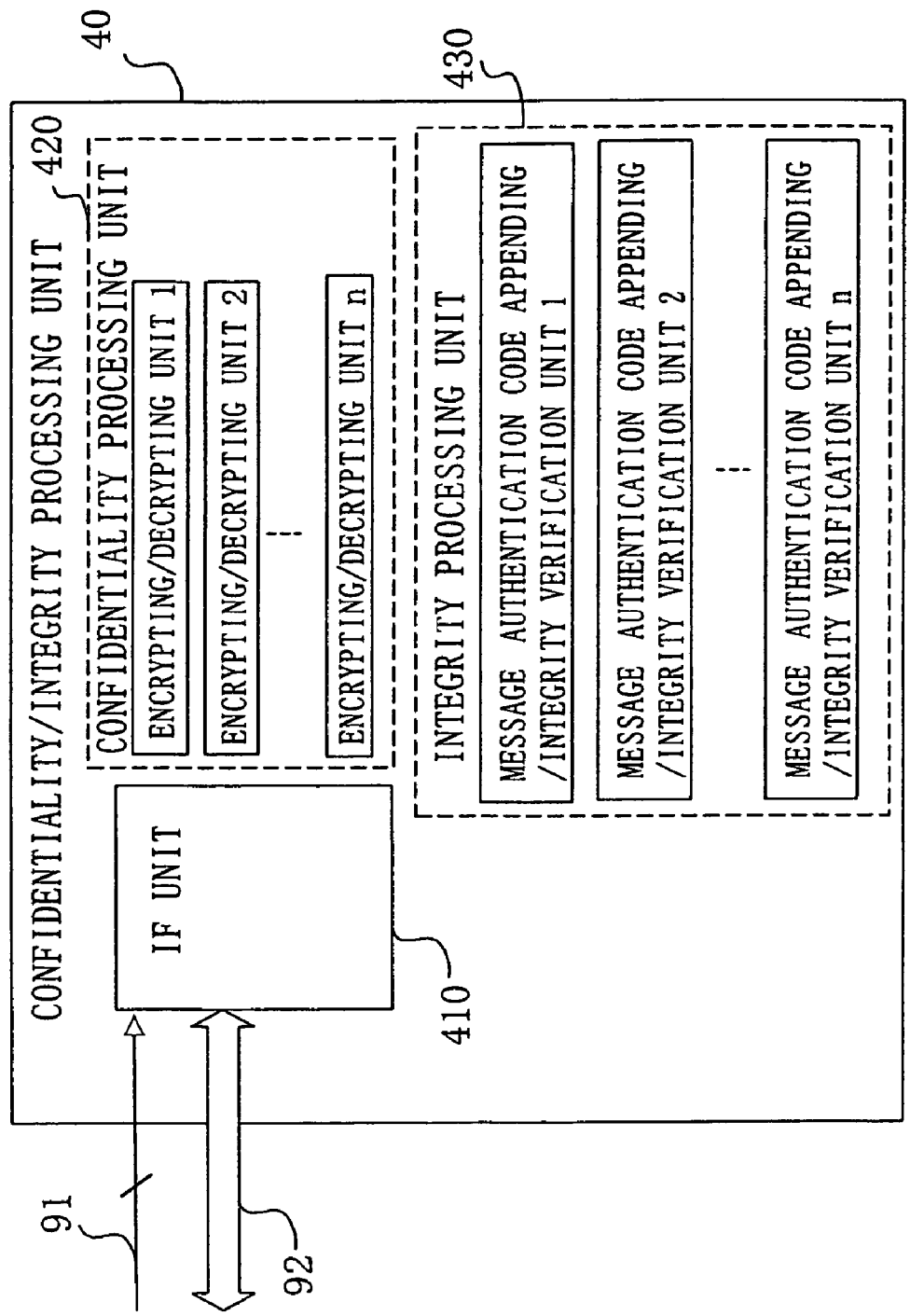
FIG. 8 shows a configuration of a confidentiality/integrity processing unit 40 according to the first embodiment.

FIG. 8 shows the case in which the confidentiality processing unit 420 is provided with multiple encrypting/decrypting units 421. Further, as shown in the figure, the integrity processing unit 430 is provided with multiple message authentication code appending/integrity verification units 431.

In FIG. 8, the encrypting/decrypting unit 421 and the message authentication code appending/integrity verification unit 431 shown in FIG. 5 are respectively made multiple. In case of FIG. 8, when the encryption and the decryption are performed using the same function, multiple encrypting/decrypting units 421 are provided corresponding to multiple channels. Similarly, when the message authentication code appending and the integrity verification are performed using the same function, multiple message authentication code appending/integrity verification units 431 are provided corresponding to multiple channels. Compared with the case shown in FIG. 7, the configuration of FIG. 8 can reduce the hardware resource and the software resource.

In cases shown in FIGS. 4 through 8, the confidentiality/integrity processing unit 40 includes both the confidentiality processing unit 420 and the integrity processing unit 430. However, the confidentiality/integrity processing unit 40 can include either of the confidentiality processing unit 420 and the integrity processing unit 430. When the confidentiality/integrity processing unit 40 includes either of the confidentiality processing unit 420 and the integrity processing unit 430, the process of the other can be performed by the radio communication control unit 20.

Embodiment 2

Figure 9:
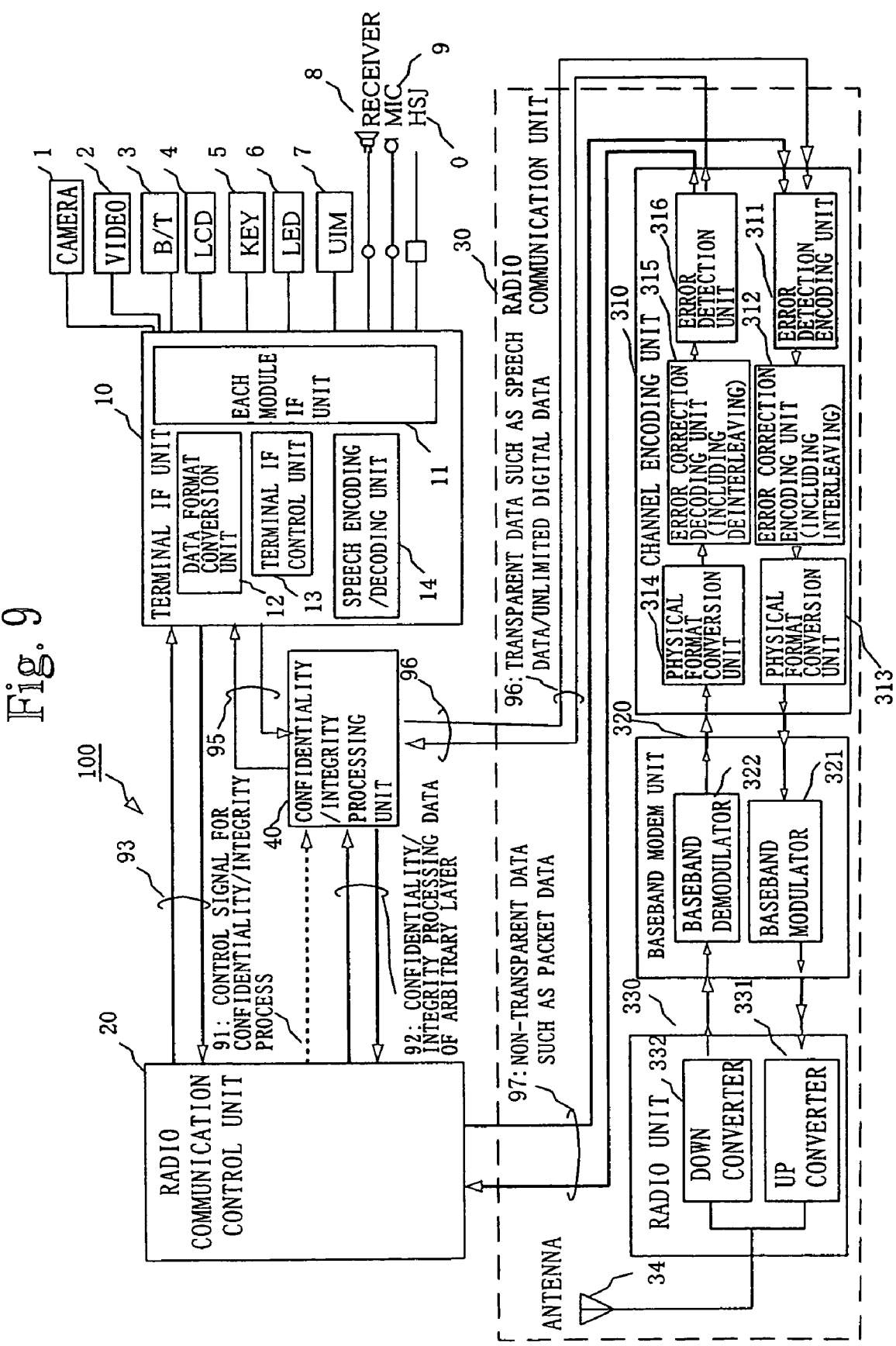
FIG. 9 shows a configuration of a mobile station (MS) 100 according to the second embodiment.

FIG. 9 shows another configuration of the mobile station (MS) 100.

Different from the configuration of FIG. 3, in FIG. 9, data is input/output between the terminal IF unit 10 and the confidentiality/integrity processing unit 40. And further, data is also input/output between the radio communication unit 30 and the confidentiality/integrity processing unit 40. In FIG. 9, non-transparent data 97 is non-transparent data such as packet data. Further, transparent data 95, 96 are transparent data such as speech data, unrestricted digital data. Transparent data means the data is not changed throughout input to output in any layers or sub-layers of the OSI reference layers. Whereas, the non-transparent data means the data requires some data processing such as data format conversion through input to output in some layers or sub-layers of the OSI reference layers. For example, at an RLC (Radio Link Control) sublayer of the layer 2, when SDU (Service Data Unit) and PDU (Protocol Data Unit) of data are different, the data is non-transparent data. When SDU and PDU of data at MAC (Media Access Control) sub-layer of the layer 2 are same, the data is transparent data. In case shown in FIG. 9, the transparent data is, for example, speech data which can be transferred to the terminal IF unit 10 without any processing on the data of the layer 1 input/output by the radio communication unit 30. On the other hand, the non-transparent data is, for example, packet data which requires some processing on the data of layer 1 output from the radio communication unit 30.

As mentioned above, the concrete examples of transparent data 95 and 96 in FIG. 9 are speech data and unrestricted digital data, each divided by transport block unit defined between layer 1 and layer 2. These transparent data divided by transports block unit equal to MACPDU (and MACSDU), and therefore each data of the transport block unit corresponds to the confidentiality processing unit.

Figure 22:
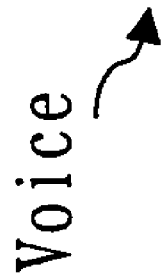
FIG. 22 shows a concrete example of voice data as one example of transparent data 95, 96.
Figure 23:
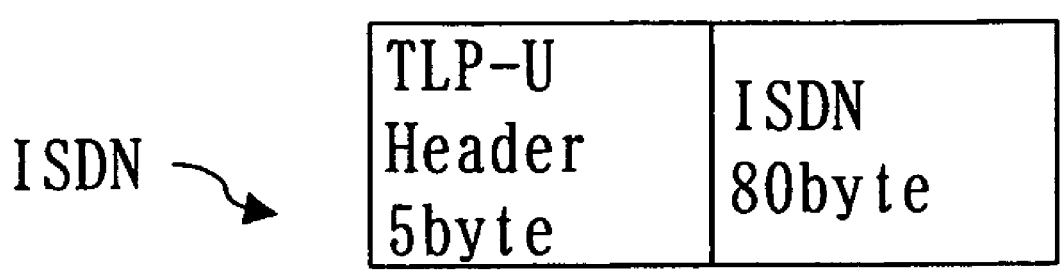
FIG. 23 shows a concrete example of unrestricted digital data as one example of transparent data 95, 96.
Figure 24:
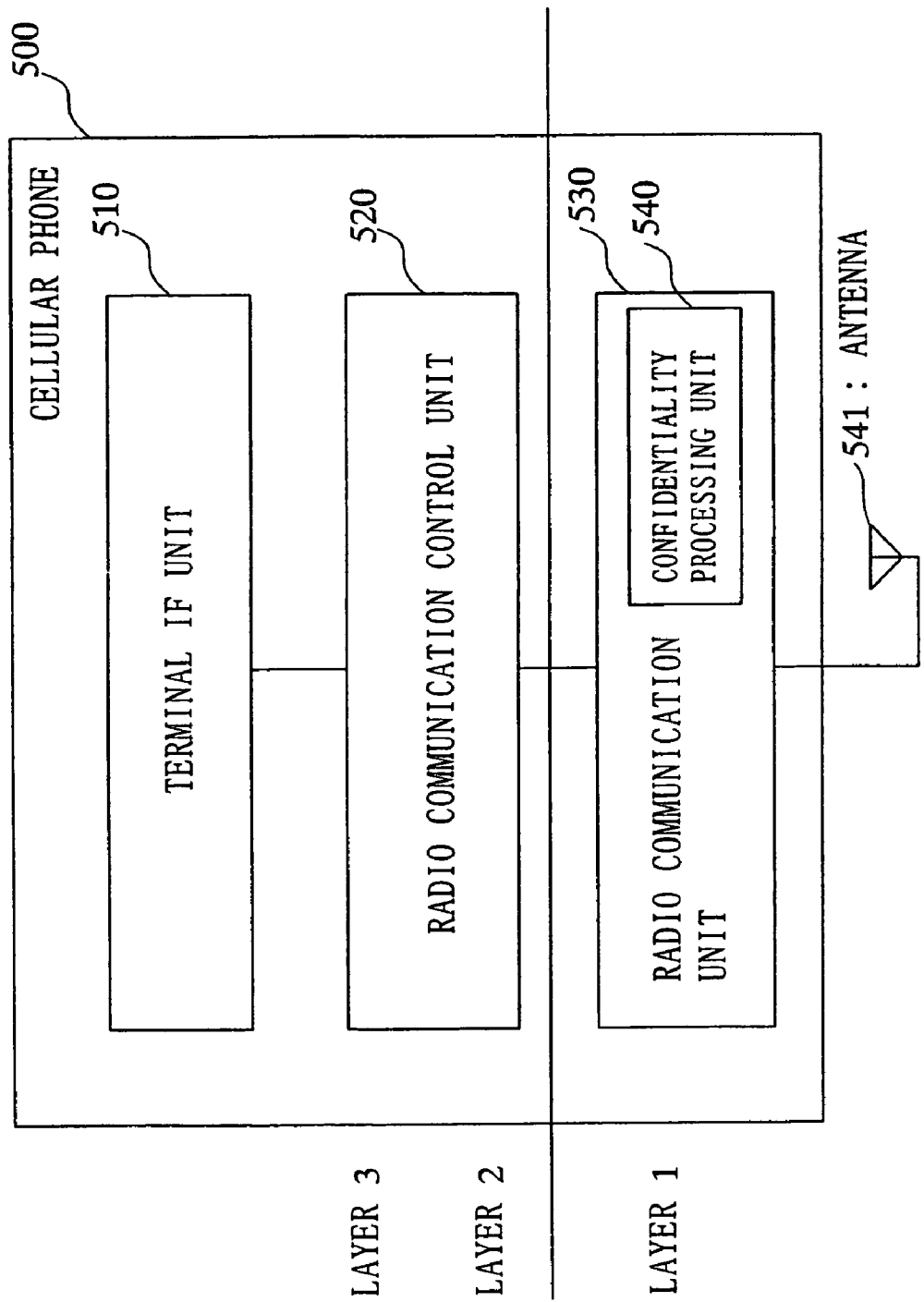
FIG. 24 shows a conventional cellular phone 500.

As data kinds such as speech data are user data which remains transparent in the RLC sub-layers, by implementing ARIB defined MT (Mobile Terminal)—TA (Tarminal Adaptor) I/F (FIGS. 22, 23) as the serial interface for this transport model, it becomes possible to perform confidentiality processing on the MA-TA I/F serial formats without any conversion.

Further, a concrete example of the non-transparent data 97 is, as described above, packet data or data for signaling, however, each data is divided into units (Transport Block) defined between the layers 1 and 2.

The confidentiality/integrity processing unit 40 shown in FIG. 9 performs the confidentiality processing and the integrity processing selectively on the non-transparent data input/output from/to the radio communication control unit 20, and at the same time, the confidentiality/integrity processing unit 40 always performs, for example, the confidentiality processing on the transparent data input/output between the terminal IF unit 10 and the radio communication unit 30. The confidentiality/integrity processing unit 40 does not perform the integrity processing on the transparent data. If the transparent data includes data which does not require the confidentiality processing, the radio communication control unit 20 makes the transparent data which does not require the confidentiality processing not input to the confidentiality/integrity processing unit 40, but input to the radio communication control unit 20. Or it is possible to make the transparent data which does not require the confidentiality processing input to the confidentiality/integrity processing unit 40, but not perform the confidentiality processing on the transparent data using the control signal from the radio communication control unit 20.

Figure 10:
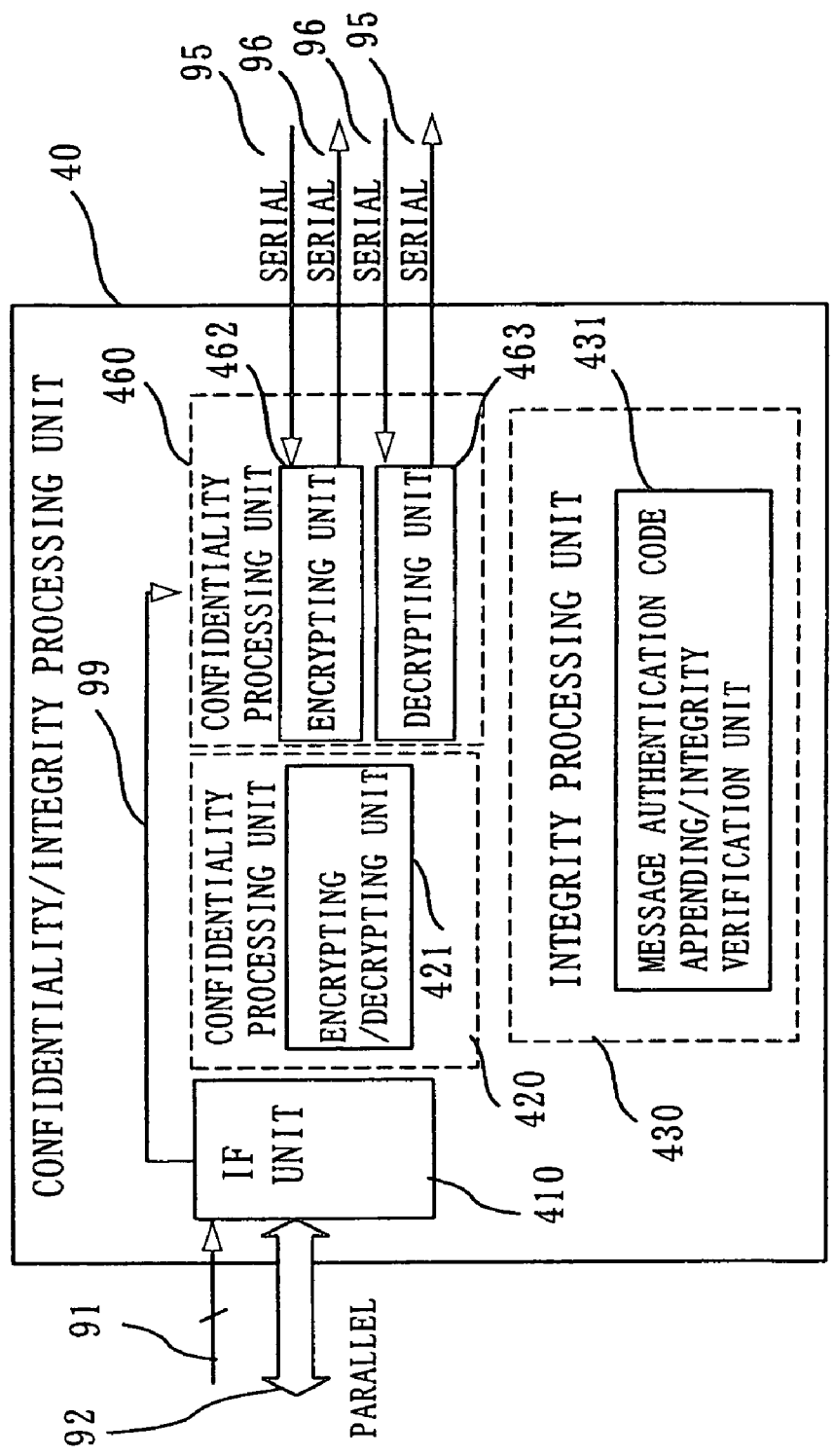
FIG. 10 shows a configuration of a confidentiality/integrity processing unit 40 according to the second embodiment.

FIG. 10 shows a configuration of the confidentiality/integrity processing unit 40.

Different from the configuration shown in FIG. 5, FIG. 10 newly includes a confidentiality processing unit 460. The confidentiality processing unit 460 includes an encrypting unit 462 and a decrypting unit 463. The encrypting unit 462 inputs the transparent data 95 from the terminal IF unit 10, encrypts the input data to output to the radio communication unit 30 as the transparent data 96. On the other hand, the decrypting unit 463 inputs the transparent data 96 from the radio communication unit 30, decrypts the input data to output to the terminal IF unit 10 as the transparent data 95. These processes of the confidentiality processing unit 460 are performed based on the control signal 99 from the IF unit 410. The control signal 99 is derived from the control signal 91. Accordingly, the confidentiality processing unit 460 performs the confidentiality processing based on the control signal issued from the radio communication control unit 20. In FIG. 10, the data 92 is input/output using the parallel interface through bus. On the other hand, the transparent data 95 and 96 are input/output to/from the confidentiality processing unit 460 through the serial interface. As explained above, FIG. 10 shows a case in which two systems of input/output interface, that is, the parallel interface and the serial interface are provided in the confidentiality/integrity processing unit 40.

Figure 11:
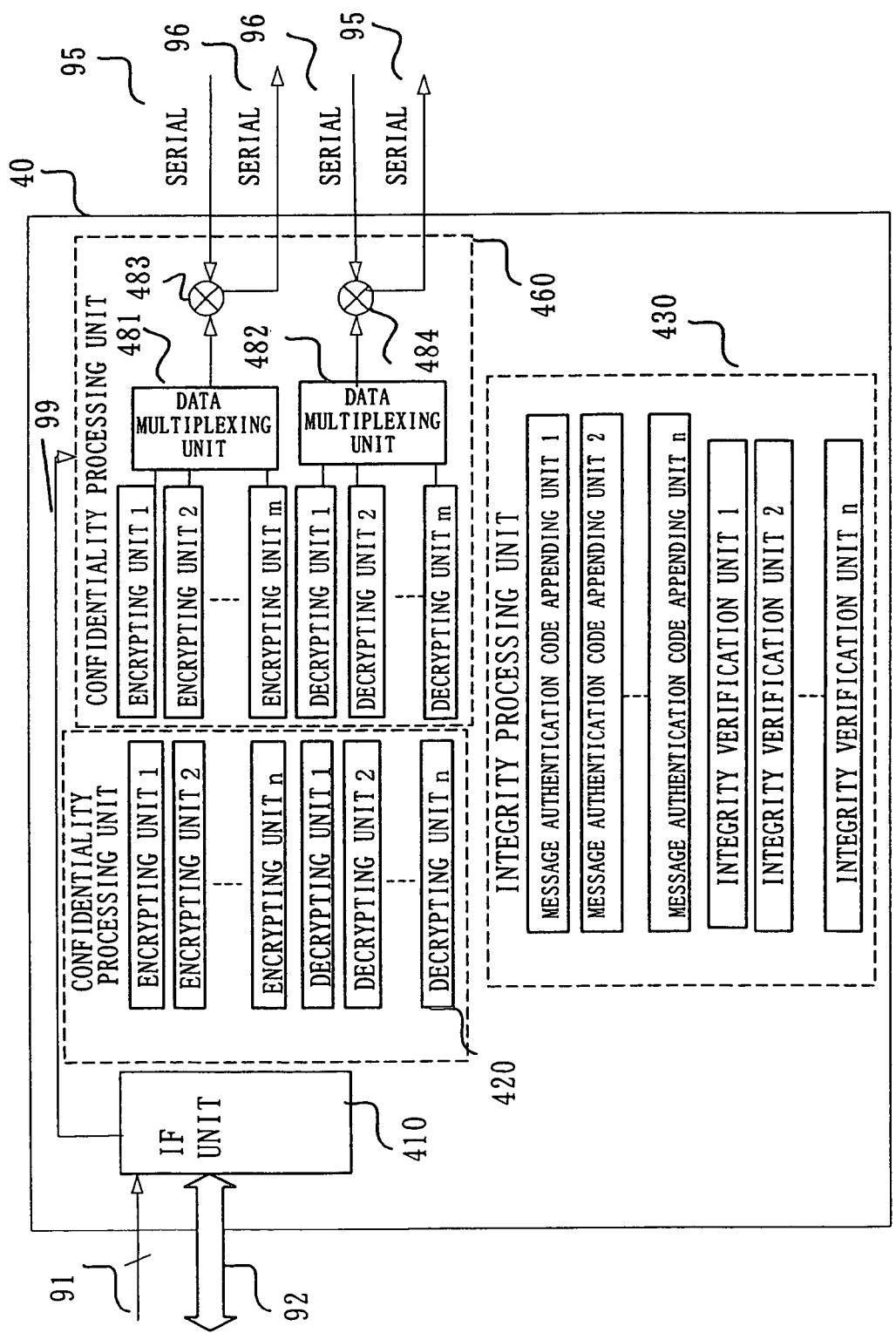
FIG. 11 shows a configuration of a confidentiality/integrity processing unit 40 according to the second embodiment.
Figure 12:
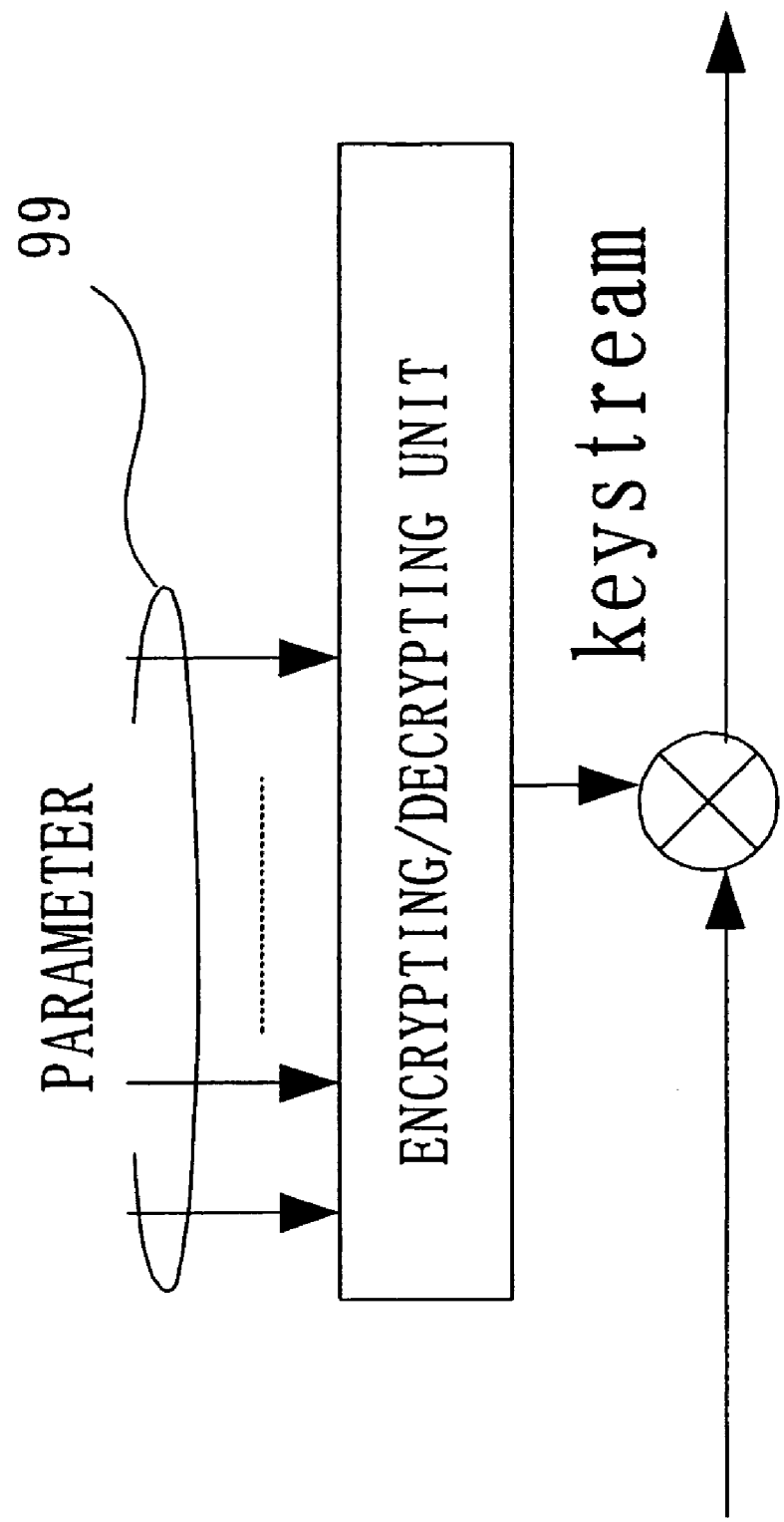
FIG. 12 shows an example of encrypting/decrypting systems.

FIG. 11 shows a configuration in which the confidentiality processing unit 460 is added to the confidentiality/integrity processing unit 40 shown in FIG. 7. It is effective to have the configuration shown in FIG. 11 when the encrypting unit or the decrypting unit generates key streams to be XORed with the serial data as shown in FIG. 12.

As shown in FIG. 11, the transparent data 95 and 96 are input/output from/to the confidentiality processing unit 460 through the serial interface, and further, the serial data which is input/output through the serial interface includes multiplexed data of multiple channels. For example, when data of channel 2 is input as serial data after data of channel 1 is input, the encrypting unit 1 corresponding to the channel 1 generates a key stream to output to a multiplexer 481, the encrypting unit 2 corresponding to the channel 2 generates another key stream to output to the multiplexer 481, and the multiplexer 481 multiplexes these key streams into format the same as the data system of the data 95. The multiplexed key stream and the data sequence of the input data 95 are XORed by the XOR circuit 483. The confidentiality processing unit 460 performs the above operations based on the control signal 99, namely, the control signal 91 supplied from the radio communication control unit 20. By using the configuration of FIG. 11, the delay of the serial data is caused only by the operation of the XOR circuit 483, which enables the high speed processing.

Figure 13:
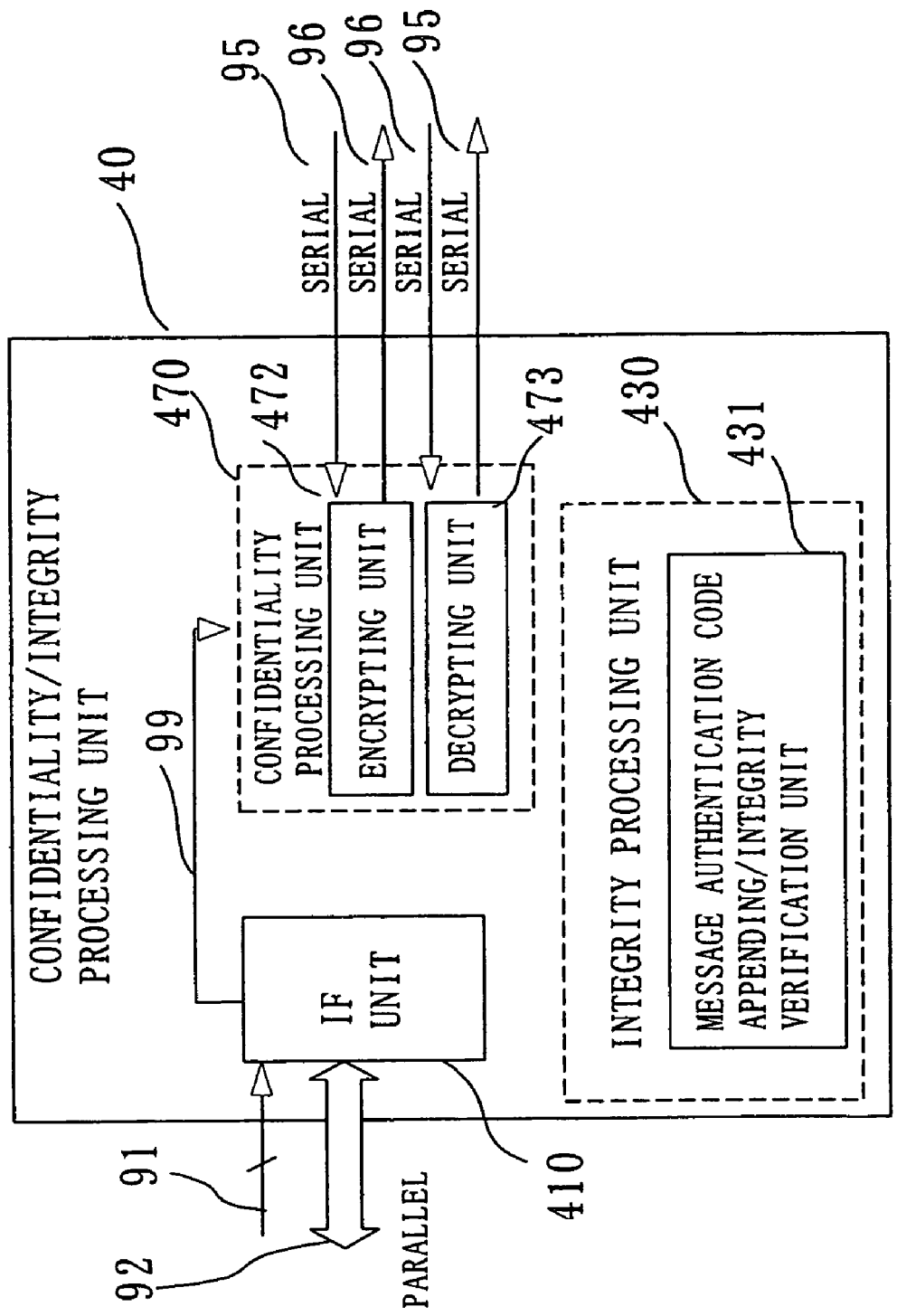
FIG. 13 shows a configuration of a confidentiality/integrity processing unit 40 according to the second embodiment.

FIG. 13 shows another configuration in which the confidentiality processing unit 420 and the confidentiality processing unit 460 of FIG. 10 are combined into one confidentiality processing unit 470.

The confidentiality processing unit 470 processes both of the data 92 input/output through the parallel interface and the data 95, 96 input/output through the serial interface. The confidentiality processing unit 420 and the confidentiality processing unit 460 are united into the confidentiality processing unit 470, so that the hardware resource can be reduced. The confidentiality processing unit 470 switches the process for the transparent data and the process for the non-transparent data based on the control signal 99, namely, the control signal 91 output from the radio communication control unit 20.

Embodiment 3

Figure 25:
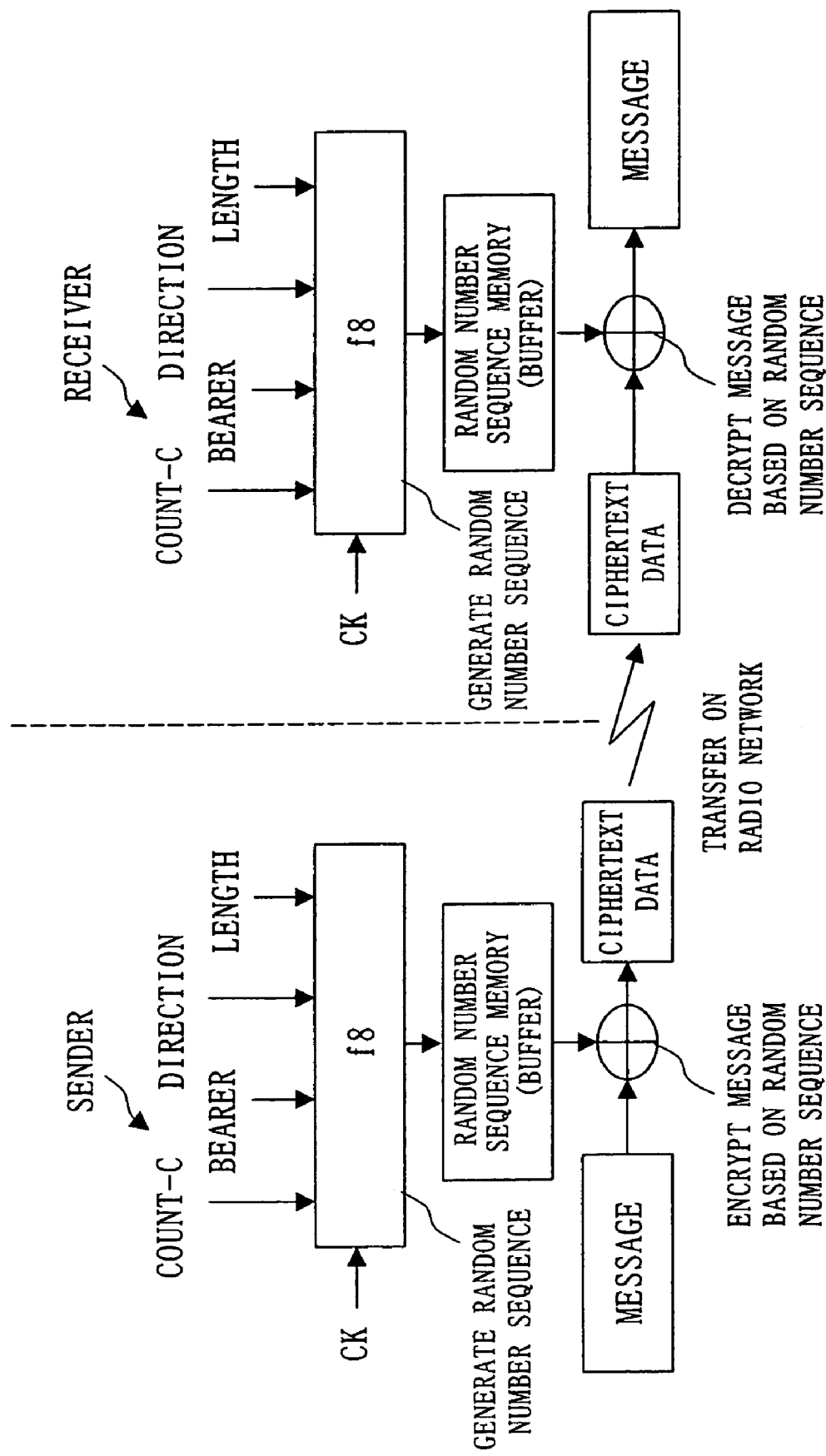
FIG. 25 shows encrypting and decrypting methods for data confidentiality processing according to the third embodiment.

FIG. 25 shows encrypting and decrypting methods for a confidentiality processing unit according to the third embodiment. The left part of FIG. 25 shows an encrypting apparatus of the sender's side. The right part of FIG. 25 shows a decrypting apparatus of the receiver's side.

Different from FIG. 15, FIG. 25 contains a random number sequence memory (buffer) for temporarily storing a random number sequence generated by a function f8 for data confidentiality processing. The random number sequence memory previously stores the random number sequence generated by the function f8 for data confidentiality processing. Namely, as soon as information for generating the random number sequence is obtained, the function f8 for data confidentiality processing starts generation of the random number sequence and outputs the random number sequence to the random number sequence memory. The random number sequence memory temporarily stores the random number sequence until a message (plaintext) is received, and outputs the random number sequence being stored synchronously with inputting the message (plaintext).

On the other hand, in case of decryption, as soon as information for generating the random number sequence is obtained, the function f8 for data confidentiality processing starts generation of the random number sequence and outputs the random number sequence to the random number sequence memory. The random number sequence memory temporarily stores the random number sequence until a message (plaintext) is received, and outputs the random number sequence which has been stored in the random number sequence memory synchronously with inputting the ciphertext data.

As described above, the features of the encrypting apparatus shown in the left part of FIG. 25 are generation of the random number sequence using the function f8 for data confidentiality processing and asynchronous operation of the message and the random number sequence. Namely, the function f8 for data confidentiality processing generates the random number sequence before the operation of the plaintext data and the random number sequence and previously stores the generated random number sequence in the random number sequence memory.

The features of decrypting apparatus shown in the right part of FIG. 25 are generation of a random number sequence using the function f8 for data confidentiality processing and asynchronous operation of the ciphertext data and the random number sequence. Namely, the function f8 for data confidentiality processing generates the random number sequence before the input of the ciphertext data and previously stores the generated random number sequence in the random number sequence memory.

The encrypting apparatus and the decrypting apparatus shown in FIG. 25 perform, for example, encryption/decryption of OFB (output feedback) mode, one of available modes for block cipher defined by ISO/IEC10116. Or, a variation of the OFB mode can be used. Or, any mode can be used as long as a random number sequence can be generated without plaintext data or ciphertext data. However, since the encrypting apparatus and the decrypting apparatus shown in FIG. 25 generate a random number sequence in advance without plaintext data or ciphertext data, a mode in which a random number sequence is generated by inputting plaintext data or ciphertext data cannot be employed for the encrypting apparatus and the decrypting apparatus shown in FIG. 25.

Here, the plaintext data means data to be encrypted and is not limited to data which can be read or written by a human. For example, text data and data consisting of characters are plaintext data. Voice data, image data, encoding data, compressed data, etc. are plaintext data if they are to be encrypted.

The chipertext data means encrypted data. The encrypted data is ciphertext data regardless of data format of the data before encryption such as text data, character data, voice data, image data, encoding data, compressed data, etc.

Figure 26:
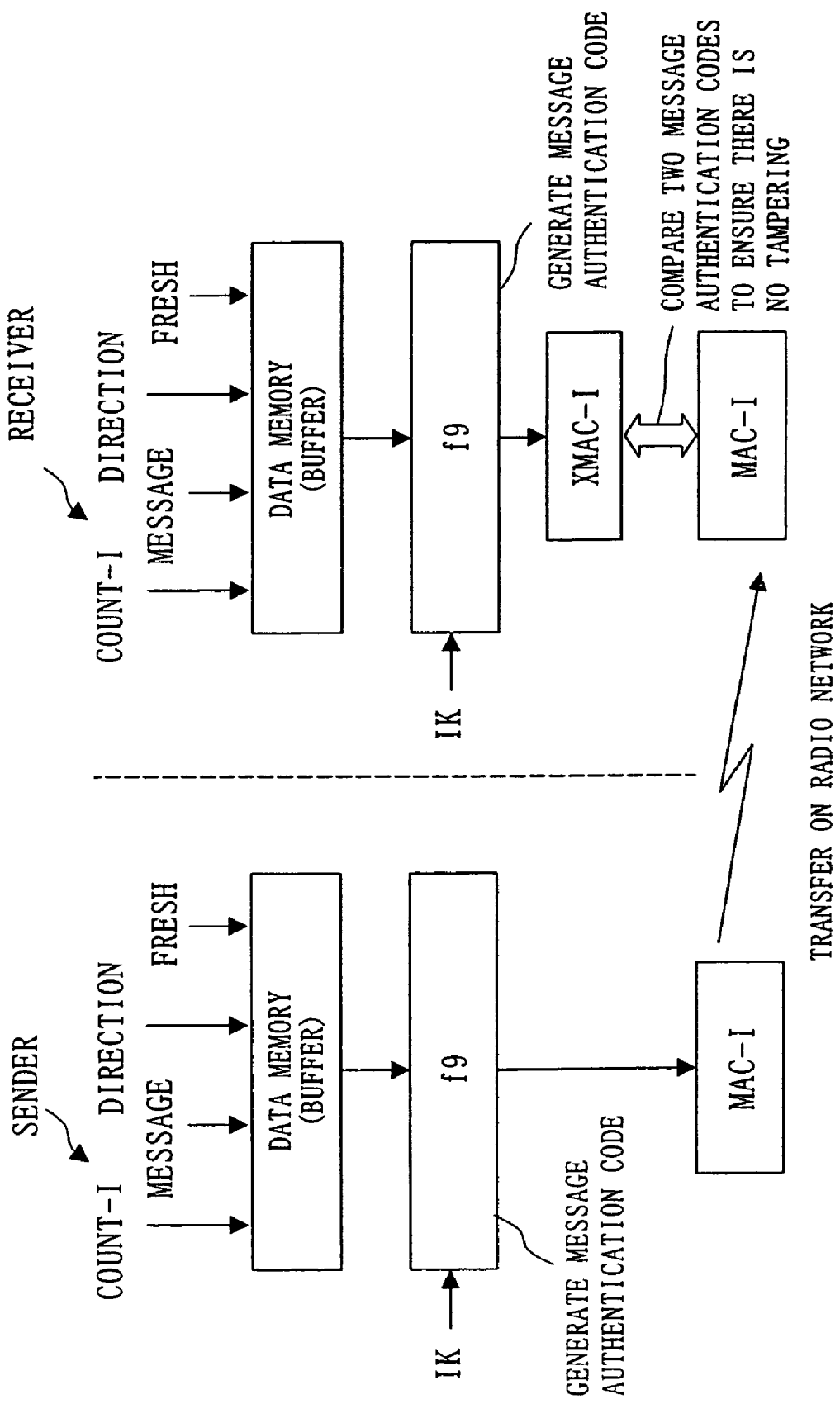
FIG. 26 shows encryption and decryption methods for data integrity processing according to the third embodiment.

FIG. 26 shows an integrity processing method performed by an integrity processing unit according to the third embodiment.

Different from FIG. 16, FIG. 26 is provided with a data memory (buffer) at a previous stage of the function f9 for data integrity processing. The data memory inputs and stores X (X≧2) pieces of data and data of X control signals. The function f9 for data integrity processing inputs the X pieces of data and the data of X control signals stored in the data memory, generates X message authentication codes, and outputs the X message authentication codes together.

In case a message authentication key (integrity key, IK) is shared with the X pieces of data, the message authentication key (IK) can be input directly to the function f9 for data integrity processing as shown in FIG. 26 without storing the message authentication key (IK) in the data memory. When the message authentication key (IK) differs for each data, the message authentication key should be stored in the data memory together with other data of control signal.

Hereinafter, concrete examples of a confidentiality processing unit and an integrity processing unit shown in FIG. 25 will be explained referring to the figures.

Figure 27:
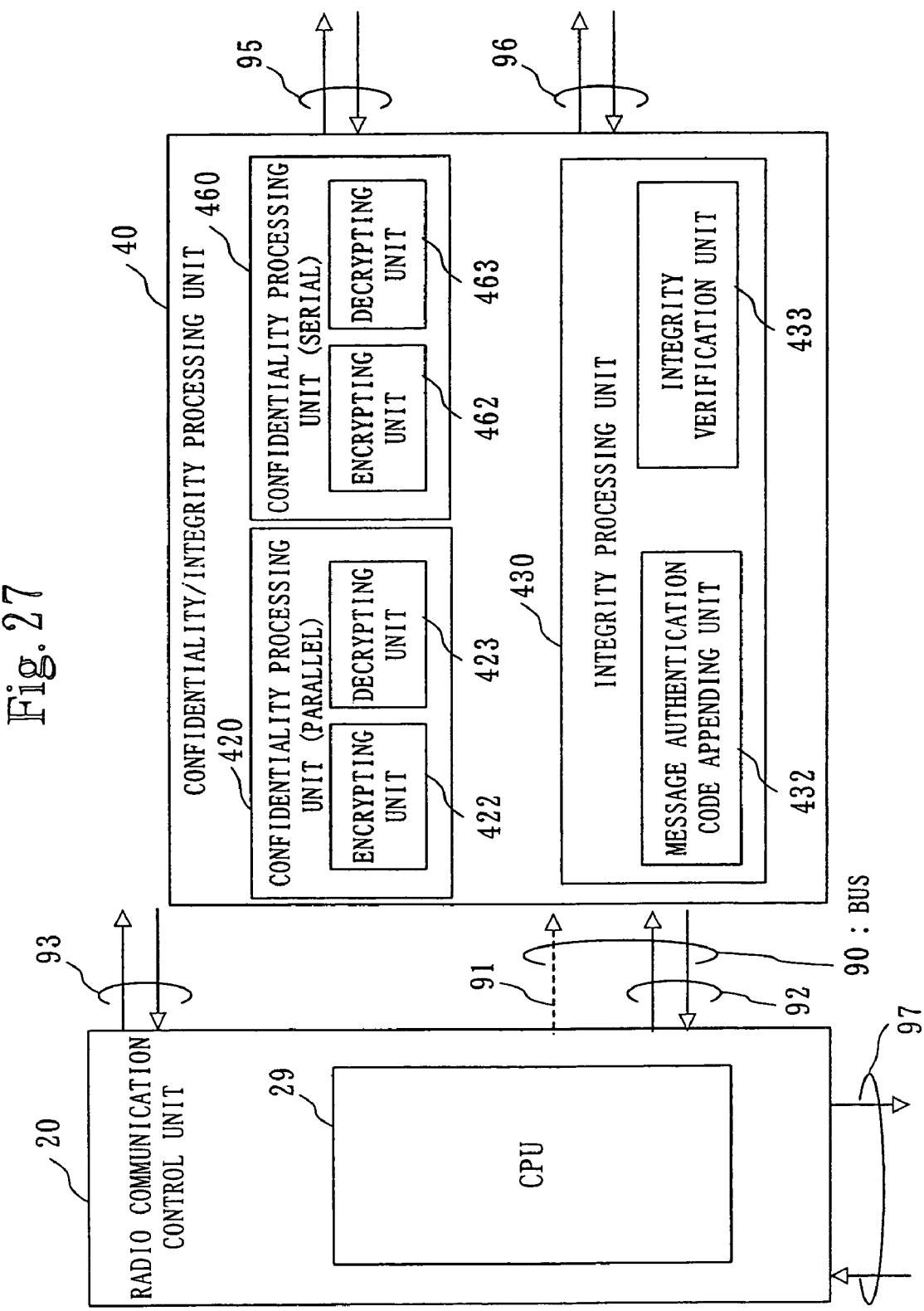
FIG. 27 shows a radio communication control unit 20 and a data confidentiality/integrity processing unit 40 according to the third embodiment.

FIG. 27 shows a radio communication control unit 20 and a confidentiality/integrity processing unit 40 according to the third embodiment.

The configuration except the following is the same with the mobile station 100 shown in FIG. 9 of the second embodiment; different points from the second embodiment will be explained referring to FIG. 27.

A CPU 29 is provided inside the radio communication control unit 20. Inside the confidentiality/integrity processing unit 40, a confidentiality processing unit 420 having a parallel interface, another confidentiality processing unit 460 having a serial interface, and an integrity processing unit 430. The confidentiality processing unit 420 includes an encrypting unit 422 and a decrypting unit 423. The confidentiality processing unit 460 includes an encrypting unit 462 and a decrypting unit 463. The integrity processing unit 430 includes a message authentication code appending unit 432 and an integrity verification unit 433. The radio communication control unit 20 and the confidentiality/integrity processing unit 40 are connected with a bus 90. The bus 90 connects the CPU 29 inside the radio communication control unit 20, the confidentiality processing unit 420, the confidentiality processing unit 460, and the integrity processing unit 430 inside the confidentiality/integrity processing unit 40, and the bus 90 transfers a control signal 91, data 92 and other kinds of data. The CPU 29 controls an entire processing of the radio communication control unit 20 by reading and executing programs stored in the recording medium such as Read Only Memory. The bus 90 is a bus for general use which connects other processing units (not illustrated) located inside or outside the radio communication control unit 20 and the confidentiality/integrity processing unit 40.

Figure 28:
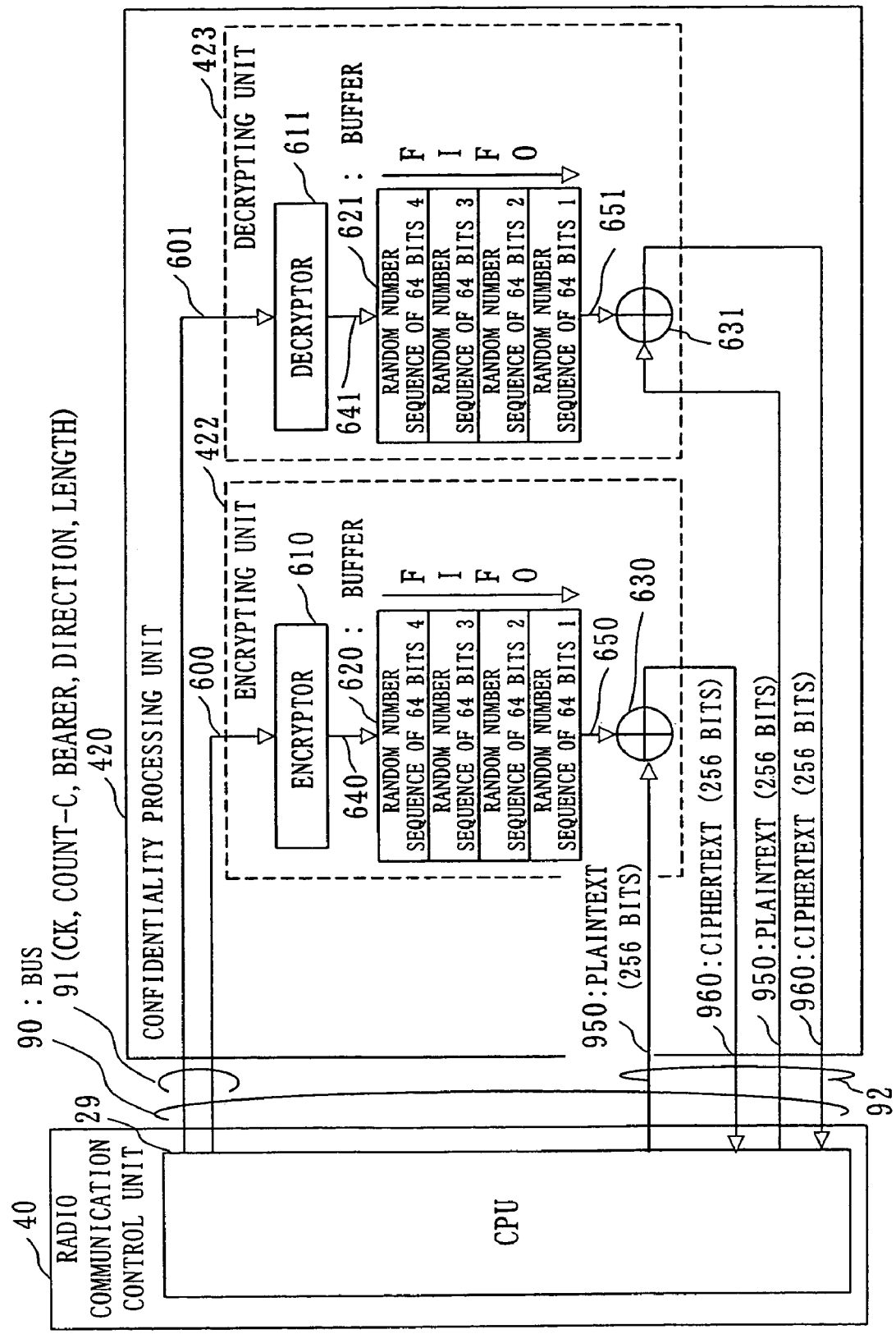
FIG. 28 shows a configuration of a confidentiality processing unit 420 of the third embodiment.

FIG. 28 shows in detail the encrypting unit 422 and the decrypting unit 423 of the confidentiality processing unit 420.

The encrypting unit 422 includes an encryptor 610, a buffer 620, and an XOR unit 630. The decrypting unit 423 includes a decryptor 611, a buffer 621, and an XOR unit 631. The encryptor 610 corresponds the function f8 for data confidentiality processing of the sender's side shown in FIG. 25. The buffer 620 corresponds the random number sequence memory of the sender's side shown in FIG. 25. Here, a FIFO memory is employed for the buffer 620. The XOR unit 630 performs, for example, XOR operations of parallel data of 64 bits simultaneously. The decryptor 611 corresponds the function f8 for data confidentiality processing of the receiver's side shown in FIG. 25. The buffer 621 corresponds the random number sequence memory of the receiver's side shown in FIG. 25. The XOR unit 631 performs, for example, XOR operations of parallel data of 64 bits at the same time.

The confidentiality processing unit 420 inputs the control signal 91 from the CPU 29 through the bus 90. At this time, plaintext data 950 has not been input yet. The CPU 29 knows the control signal 91 in advance and is able to transfer the control signal 91 to the confidentiality processing unit 420 from the CPU 29 before transferring the plaintext data 950. The control signal 91 includes at least an encryption key (cipher key, CK), and further, in this example, other than CK, a bit length of data to be encrypted/decrypted (LENGTH, the bit length=256 bits in case of FIG. 28), an up/down link (DIRECTION), a counter (COUNT-C), and a logical channel identifier (BEARER). The encryption key (CK), the bit length of data to be encrypted/decrypted (LENGTH), the up/down link (DIRECTION), the counter (COUNT-C), and the logic channel identifier (BEARER) are input to the encrypting unit 422 or the decrypting unit 423 as a control signal 600 or another control signal 601. On inputting the control signal 600, the encryptor 610 starts generating a random number sequence and outputs the random number sequence to the buffer 621. Here it is assumed that the encryptor 610 generates the random number sequence by 64-bit unit. In this case, the random number sequence of 64-bit unit is output from the encryptor 610 and temporarily stored in the buffer 620. As described above, when the bit length of the data to be encrypted (LENGTH) is 256 bits, the encryptor 610 generates four random number sequences of 64 bits and composes a random number sequence having enough length (64 bits×4) suitable for the bit length of the data to be encrypted (256 bits).

FIG. 28 shows a case in which the buffer 620 stores four random number sequences having 64 bits.

Subsequently, the CPU 29 transfers the plaintext data 950 having a bit length of 256 bits by 64-bit unit to the encrypting unit 422 through the bus 90. When the XOR unit 630 inputs the plaintext data 950 by 64-bit unit, the buffer 620 sequentially outputs the random number sequence 650 of 64 bits. The XOR unit 630 performs XOR operations of the plaintext data 950 and the random number sequence 650 by 64-bit unit at the same time and generates the ciphertext data 960 of 64 bits. The ciphertext data 960 is returned to the CPU 29.

An operation of the decrypting unit 423 is the same as the one of the encrypting unit 422, except that the input of the XOR unit 631 is the ciphertext data 960 and the output is the plaintext data 950, and its explanation will be omitted here.

The XOR unit 630 is not always required to input the plaintext data 950 after generating four random number sequences (having 256 bits) in the buffer 620, but the XOR unit 630 can start XOR operation when at least one random number sequence of 64 bits is stored in the buffer 620. In this case, the generation of the random number sequence by the encryptor 610 and the XOR operation by the XOR unit 630 are performed parallelly and simultaneously. While the XOR unit 630 performs the XOR operation of the plaintext data 950, the encryptor 610 inputs a next control signal 600, generates the random number sequence for the plaintext data 950 which will be input next, and stores the random number sequence in advance for the next plaintext data in the buffer 620.

In this way, prior to the input of the plaintext data 950 from the CPU 29, the encrypting unit 422 previously stores the random number sequence in the buffer 620. Accordingly, there is no waiting time for the operation in the XOR unit, which enables a high-speed encryption. Similarly, a high-speed decryption can be performed in the decrypting unit 423.

As for the capacity of the buffer 620 or the buffer 621, it is enough to be equal to or greater than the unit size of the random number sequence output from the encryptor 610 or the decryptor 611; however, it is desirable to be equal to or greater than the maximum value of the bit length (LENGTH) of the data to be encrypted/decrypted specified within this system. For example, if the unit size of the random number sequence output from the encryptor 610 or the decryptor 611 is 64 bits and the maximum value of the bit length (LENGTH) of the data to be encrypted/decrypted is 5114 bits, it is desirable that the capacity of the buffer 620 or the buffer 621 is equal to or greater than 5120 bits (64×80).

Further, the XOR unit 631 performs XOR operations of, for example, 64 bits; however, parallel data of other bit size such as 32 bits or 128 bits can be processed.

It has been discussed that the unit size of the random number sequence output by the encryptor 610 or the decryptor 611 is 64 bits; however, the unit size of the random number sequence can vary such as 32 bits, 128 bits, etc.

It is not always required that the unit size of the random number sequence output from the encryptor 610 or the decryptor 611, the read/write size of the buffer 620 or 621, and the bit size of the parallel data of the XOR unit 631 are the same.

Figure 29:
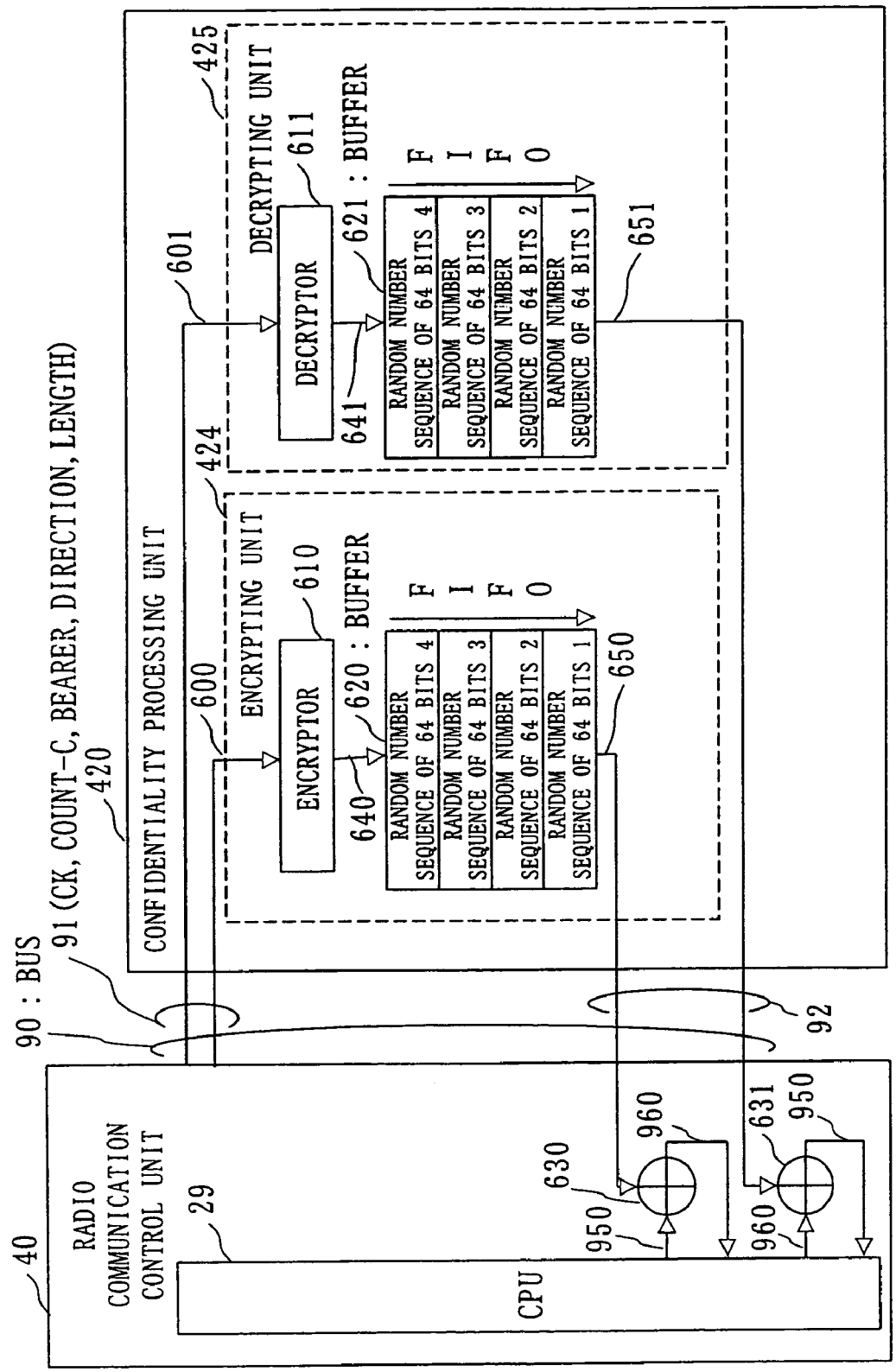
FIG. 29 shows a configuration of the confidentiality processing unit 420 of the third embodiment.

FIG. 29 shows another example of the radio communication control unit 20 and the confidentiality processing unit 420.

Different from FIG. 28, the XOR unit 630 and the XOR unit 631 are not placed in the confidentiality processing unit 420 but in the radio communication control unit 20 in case of FIG. 29.

The CPU 29 reads the random number sequence (as many as plural sequences together) for the plaintext data 950 from the buffer 620 through the bus 90 and supplies the random number sequences to the XOR unit 630. In the XOR unit 630, the XOR between the plaintext data 950 and the random number sequence 650 is performed to generate the ciphertext data 960.

Similarly, in the XOR unit 631, the random number sequence 651 is read from the buffer 621 by the CPU 29 through the bus 90, the XOR operation is performed with the ciphertext data 960, and the plaintext data 950 is output.

In case of FIG. 29, the operation is such simple that the CPU 29 reads the random number sequence from the buffer 620, and the plaintext data 950 and the ciphertext data 960 do not have to be sent/returned through the bus 90. Therefore, compared with the configuration of FIG. 28, the amount of data that passes the bus 90 can be reduced to equal to or less than a half. Further, the waiting time to use the bus 90 can be reduced. Yet further, it is possible to eliminate the competition to use the bus 90.

In both cases of FIGS. 28 and 29, the XOR unit 630 and the XOR unit 631 can be implemented by hardware, software, or a combination of the hardware and software.

Figure 30:
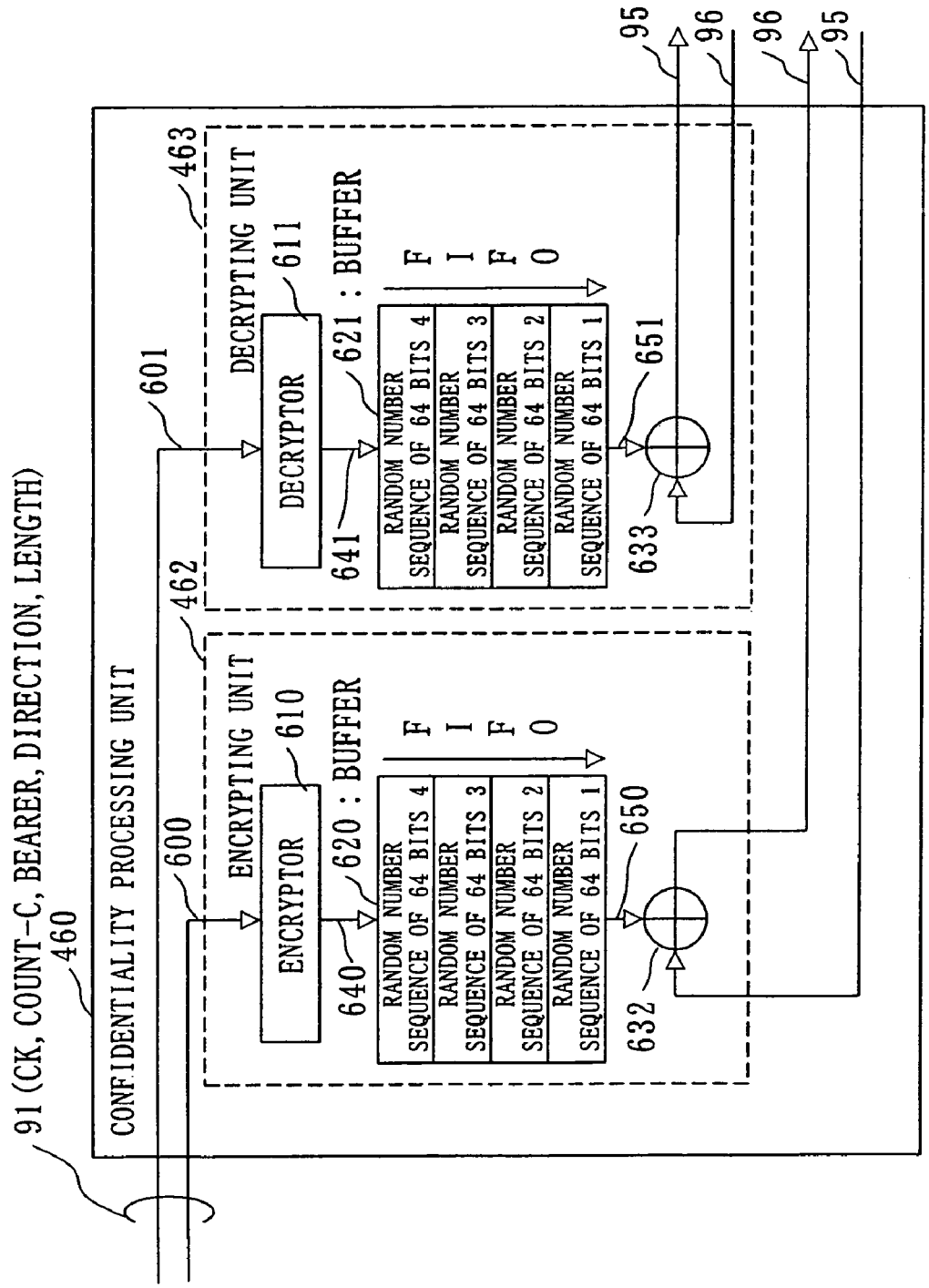
FIG. 30 shows a configuration of a confidentiality processing unit 460 of the third embodiment.

FIG. 30 is a detailed diagram showing the encrypting unit 462 and the decrypting unit 463 of the confidentiality processing unit 460 having a serial interface.

Different from FIG. 28, an XOR unit 632 which performs the XOR operation of serial data of 1 bit is provided instead of the XOR unit 630 which performs the XOR operation of parallel data. And further, an XOR unit 633 which performs the XOR operation of serial data of 1 bit is provided instead of the XOR unit 631 which operates the XOR of parallel data. In the XOR unit 632, the transparent data 95 is input, the XOR operation with the random number sequence 650 is performed serially by 1 bit, and the encrypted transparent data 96 is output. On the other hand, in the XOR unit 633, the transparent data 96 is input, the XOR operation with the random number sequence 651 is performed serially by 1 bit, and the decrypted transparent data 95 is output.

In case of FIG. 30, the random number sequence is previously generated and stored in the buffer 620 and the buffer 621, so that the waiting time is eliminated in the XOR unit 632 and the XOR unit 633, which enables a high-speed XOR operation.

In case of FIG. 30, the XOR unit 632 and the XOR unit 633 also can be implemented by hardware, software, or a combination of the hardware and software.

Further, the XOR unit 632 and the XOR unit 633 can be located outside the confidentiality processing unit 460.

Figure 31:
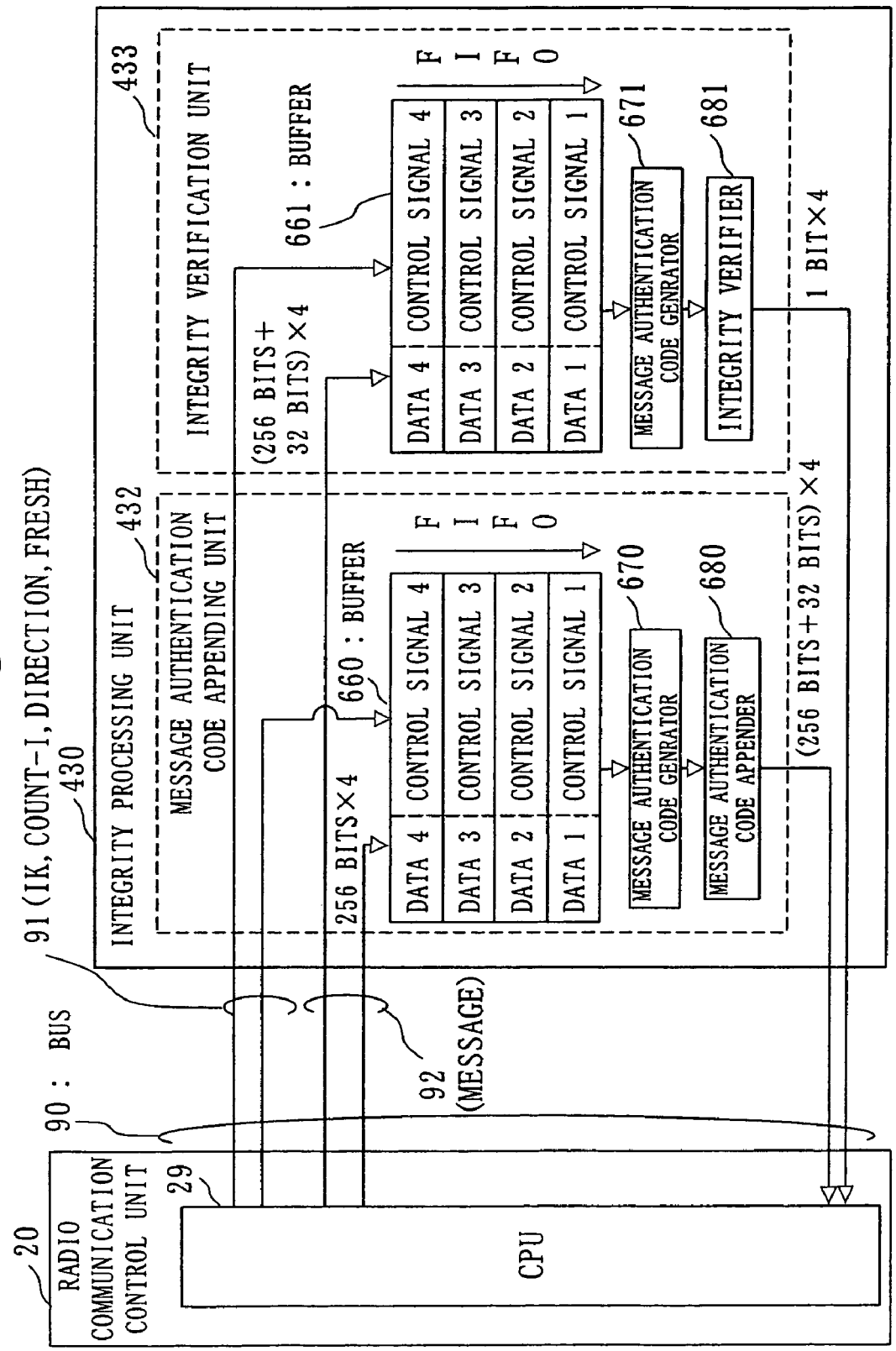
FIG. 31 shows a configuration of a integrity processing unit 430 of the third embodiment.

FIG. 31 is a detailed diagram showing the message authentication code appending unit 432 and the integrity verification unit 433 of the integrity processing unit 430.

The message authentication code appending unit 432 is provided with a buffer 660, a message authentication code generator 670, and a message authentication code appender 680. The integrity verification unit 433 is provided with a buffer 661, a message authentication code generator 671, and an integrity verifier 681. The buffer 660 and the buffer 661 are FIFO memories. The buffer 660 and the buffer 661 correspond to the data memory in FIG. 26. The message authentication code generator 670 and the message authentication code generator 671 correspond to the function f9 for data integrity processing in FIG. 26. The message authentication code appender 680 appends the message authentication code to the data. The integrity verifier 681 compares the message authentication code received from the sender's side and the message authentication code generated at the receiver's side, and if they match, the integrity verifier 681 verifies the integrity of the data.

In FIG. 31, the CPU 29 sends four pieces of data 92, which require integrity verification, together to the message authentication code appending unit 432. The CPU 29 also sends four control signals 91 together corresponding to the four pieces of data 92, which require integrity verification. The control signal 91 includes at least a message authentication key (IK), and further an up/down link (DIRECTION), a counter (COUNT-C), and a random number (FRESH) generated for each user. The CPU 29 transfers at least the up/down link (DIRECTION), the counter (COUNT-C), and the random number (FRESH) generated for each user to the buffer 660 as the control signal 91 corresponding to the four pieces of data. As for the message authentication key (IK), four respective message authentication keys (IK) corresponding to the four pieces of data can be transferred to the buffer 660, and when the message authentication key (IK) is a fixed value common to the four pieces of data, the message authentication key (IK) does not need to be stored in the buffer 660 but can be directly input to the message authentication code generator 670.

The control signal 91 can be transferred through the control signal line of the bus 90 as the control signal and also can be transferred through the data signal line of the bus 90 as the data. The four control signals 91 can be sent together with the four pieces of data and also can be sent separately. The buffer 660 inputs and stores the four pieces of data and the four control signals together. Here, that the CPU 29 transfers the four pieces of data or the four control signals together means that four pieces of data or four control signals are transferred by one transfer instruction. Hereinafter, "together" means "by a single instruction" or "treating plural things together as a group, not separately." The load of the CPU 29 and each processing unit can be reduced as a result of an execution of the single instruction. Further, the number of transfers which pass through the bus 90 or each transmission line (not illustrated) can be reduced as a result of a transfer or an input/output by "treating plural things together as a group, not separately."

The buffer 660 makes the correspondence between the data and the control signal and stores it as correspondence data. The message authentication code generator 670 inputs the correspondence data and generates the message authentication code of the data based on the control signal. The message authentication code generator 670 generates four message authentication codes from the four pieces of correspondence data using a predetermined algorithm, respectively, and outputs the four message authentication codes to the message authentication code appender 680 together. The message authentication code generator 670 generates four message authentication codes having 32-bit length each. The message authentication code appender 680 appends the four message authentication codes to the four pieces of data, respectively, and transfers them by one instruction of the CPU 29.

In case of inputting four pieces of data having 256-bit length, the message authentication code appending unit 432 returns the data having (256+32)×4 bits to the CPU 29.

On the other hand, the integrity verification unit 433 inputs the four pieces of data with the message authentication codes appended together. The integrity verification unit 433 inputs also four control signals 91 together. As discussed above, the message authentication key (IK) can be stored in the buffer 661 or can be directly input to the message authentication code generator 671.

The buffer 661 makes the correspondence of the four pieces of data and stores it as correspondence data. The message authentication code generator 671 reads the four pieces of correspondence data stored in the buffer 661 and generates four message authentication codes using the same algorithm as the message authentication code generator 670 at the sender's side. The integrity verifier 681 compares the four message authentication codes appended to the input four pieces of data and the four message authentication codes generated by the message authentication code generator 671, respectively. If they match, the integrity verifier 681 sends a response showing a normal status, since the integrity has been verified.

When the integrity verification unit 433 inputs data consisting of four pieces of data having 256-bit length and four message authentication codes having 32-bit length ((256+3)bits×4), the integrity verifier 681 sends a response of "1 bit×4" to the CPU 29.

While conventionally plural pieces of data are respectively transferred to the integrity processing unit 430 from the CPU 29, in case of FIG. 31, four pieces of data can be transferred together, which improves utilization efficiency of the bus 90. Namely, a waiting time of the bus 90 can be reduced, and a competition to use the bus 90 can be also reduced.

FIG. 31 shows a case in which four pieces of data are transferred together; however, the number of pieces of data is not limited to four. Further, the number of pieces of data that the buffer can hold is not limited to four as well.

The bit length of the data is not limited to 256 bits, for example, the bit length can be 512 bits or 5114 bits. The capacity of the buffers 660 and 661 is enough for storing data if it is at least twice as a total bit length of the bit length of data and the bit length of control signal; that is, the capacity of the buffers is enough when the buffer can store at least two pieces of correspondence data. For example, when the maximum value of the bit length of data which can be specified within this system is 5114 bits, it is preferable that the capacity of the buffers 660 and 661 is at least (5114 bits+the bit length of the control signal)×2, respectively.

Figure 32:
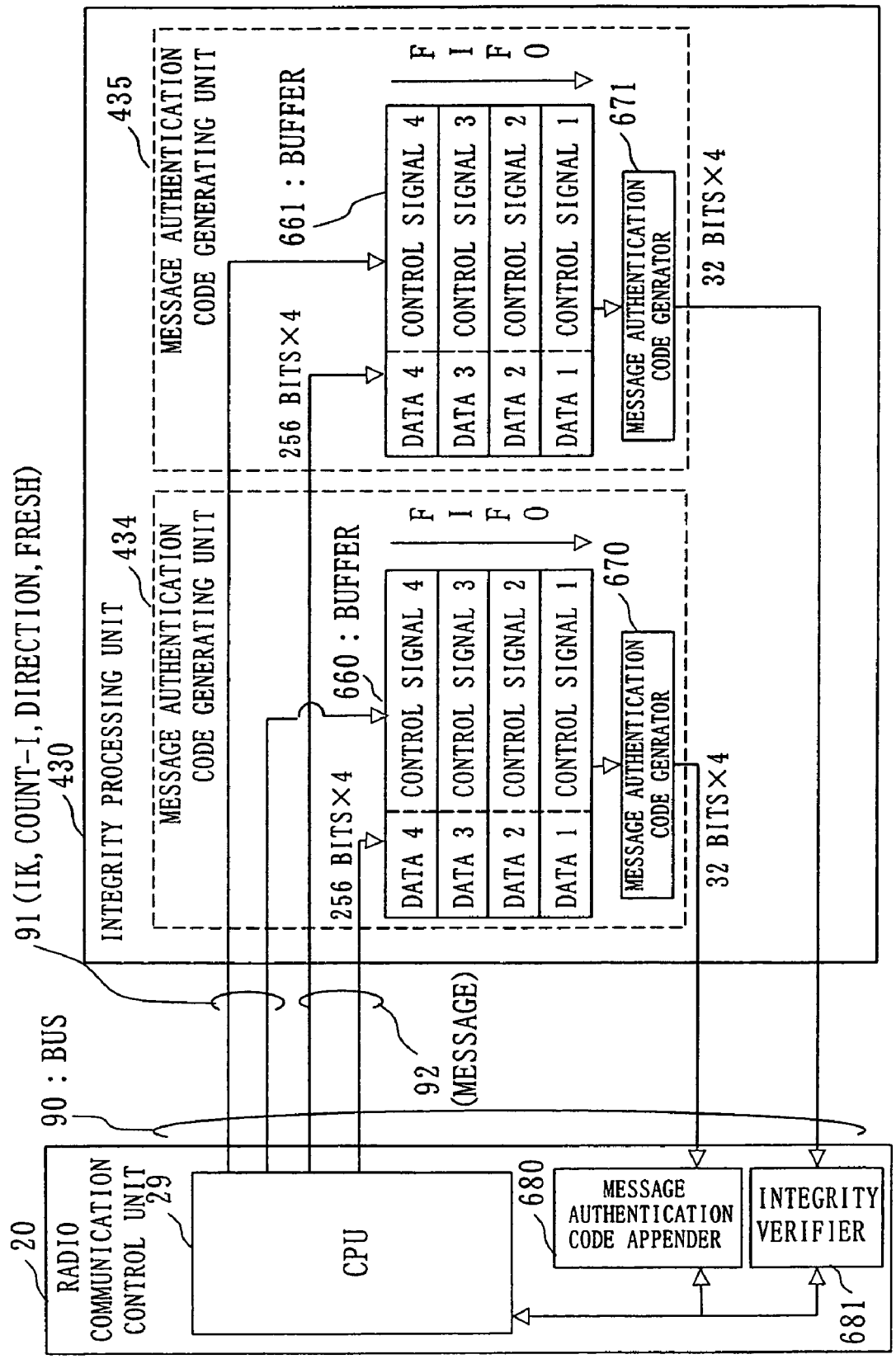
FIG. 32 shows a configuration of the integrity processing unit 430 of the third embodiment.

FIG. 32 shows another example of the radio communication control unit 20 and the integrity processing unit 430. The integrity processing unit 430 shown in FIG. 32 includes message authentication code generating units 434 and 435.

Different from FIG. 31, in FIG. 32 the message authentication code appender 680 and the integrity verifier 681 are not included in the integrity processing unit 430 but placed in the radio communication control unit 20. In case of FIG. 32, the message authentication code generator 670 transfers four message authentication codes to the message authentication code appender 680 by one transfer instruction issued from the CPU 29. On the other hand, the message authentication code generator 671 transfers four authentication codes to the integrity verifier 681 by one transfer instruction issued from the CPU 29.

In case of FIG. 32, the amount of data transfer of the bus 90 from the message authentication code generator 670 to the message authentication code appender 680 is 32 bits×4. Further, the amount of data transfer of the bus 90 from the message authentication code generator 671 is also 32 bits×4.

The amount of data transfer from the integrity processing unit 430 to the radio communication control unit 20 shown in FIG. 32 can be greatly reduced compared with the amount of data returning transfer in case of FIG. 31, since the message authentication code generator 670 does not need to return data to the message authentication code appender 680.

In the integrity processing unit 430 shown in FIG. 32, the message authentication code generating unit 434 and the message authentication code generating unit 435 have the same configuration, so that they can be incorporated into one.

In cases of FIGS. 31 and 32, the data transferring process of the bus 90, the inputting/outputting process of the buffers 660, 661, the authentication code generating process of the message authentication code generators 670, 671, the authentication code appending process of the message authentication code appender 680, and the verifying process of the integrity verifier 681 are performed on plural pieces of data "together." From a viewpoint of utilization efficiency of the CPU 29 and the bus 90, it is desirable to perform at least one of the data sending process and the data receiving process of the bus 90 "by a single instruction" or by "treating plural pieces of data as a group, not separately."

In both cases of FIGS. 31 and 32, the message authentication code generator 670, the message authentication code generator 671, the message authentication code appender 680, and the integrity verifier 681 can be implemented by the hardware, the software, or a combination of the hardware and the software.

Figure 33:
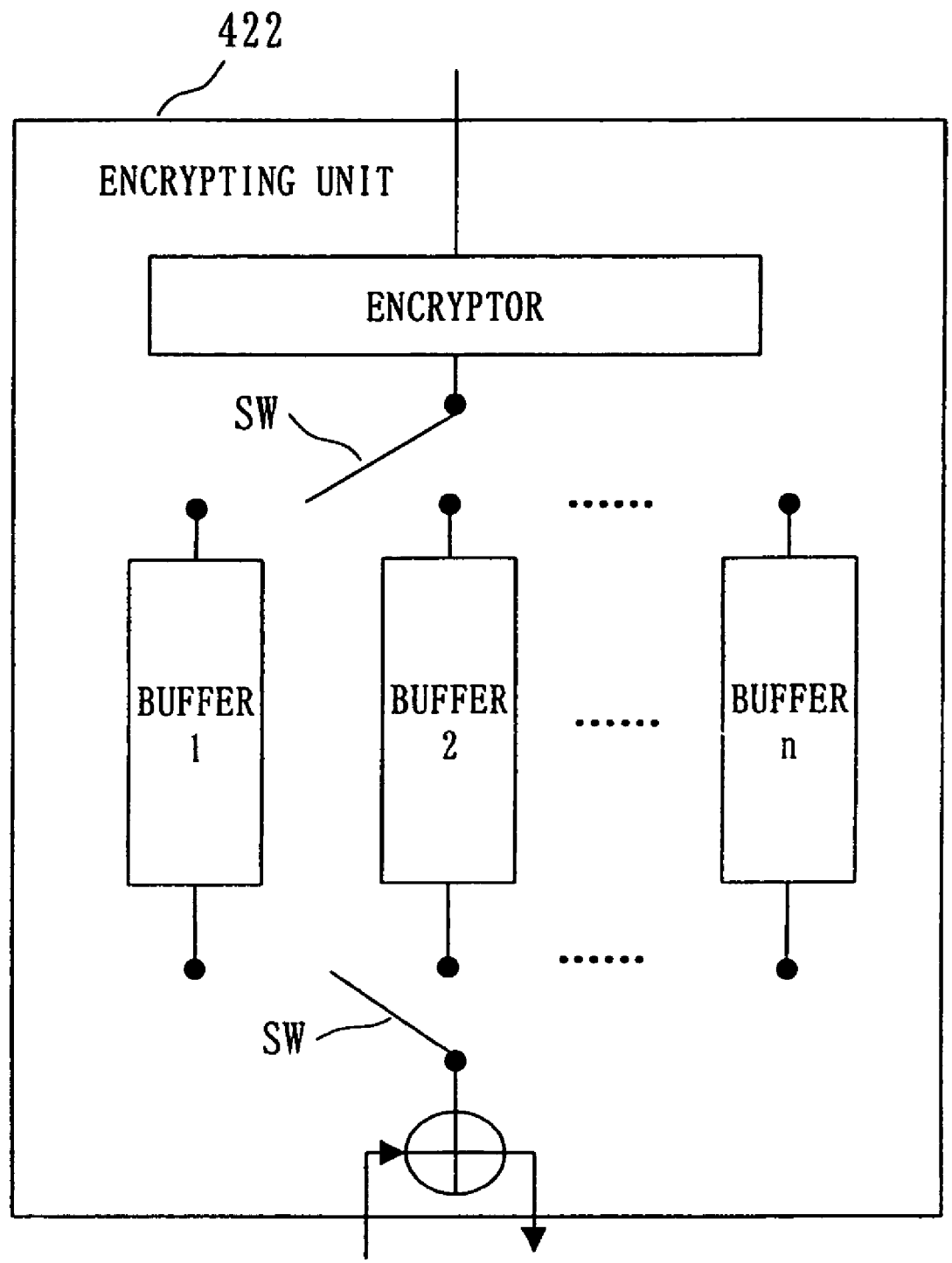
FIG. 33 shows a configuration of an encrypting unit 422 of the third embodiment having multiple buffers.

FIG. 33 shows another configuration of the encrypting unit 422.

FIG. 33 shows a case in which plural buffers are provided and they are switched by a switch SW. The switch SW can be switched by, for example, a logical channel identifier. Namely, when there are n logical channels, a random number sequence can be prepared in advance for each logical channel by providing n buffers.

Figure 34:
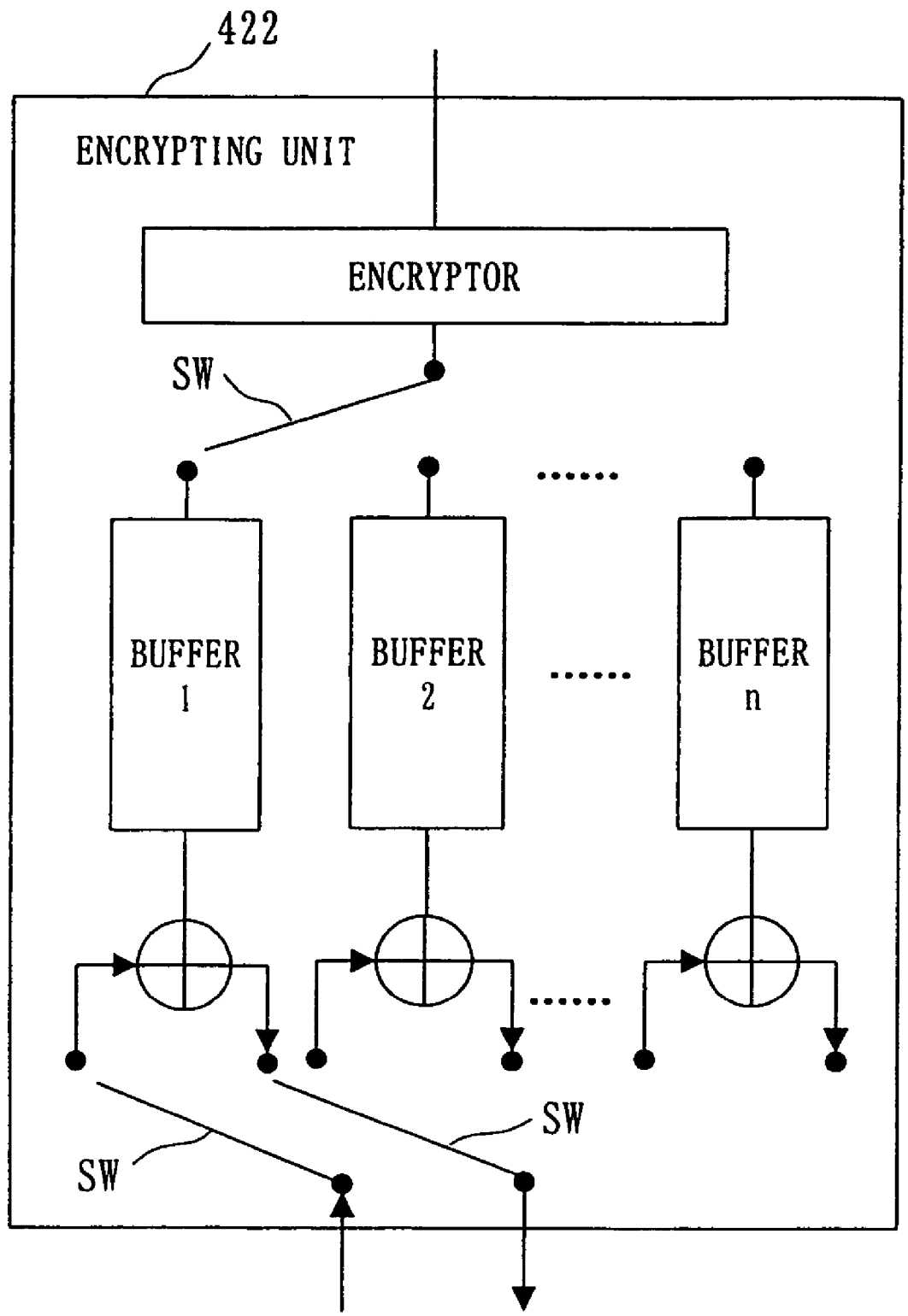
FIG. 34 shows a configuration of the encrypting unit 422 of the third embodiment having multiple buffers.

FIG. 34 shows a case in which n buffers and n XOR circuits are provided.

Figure 35:
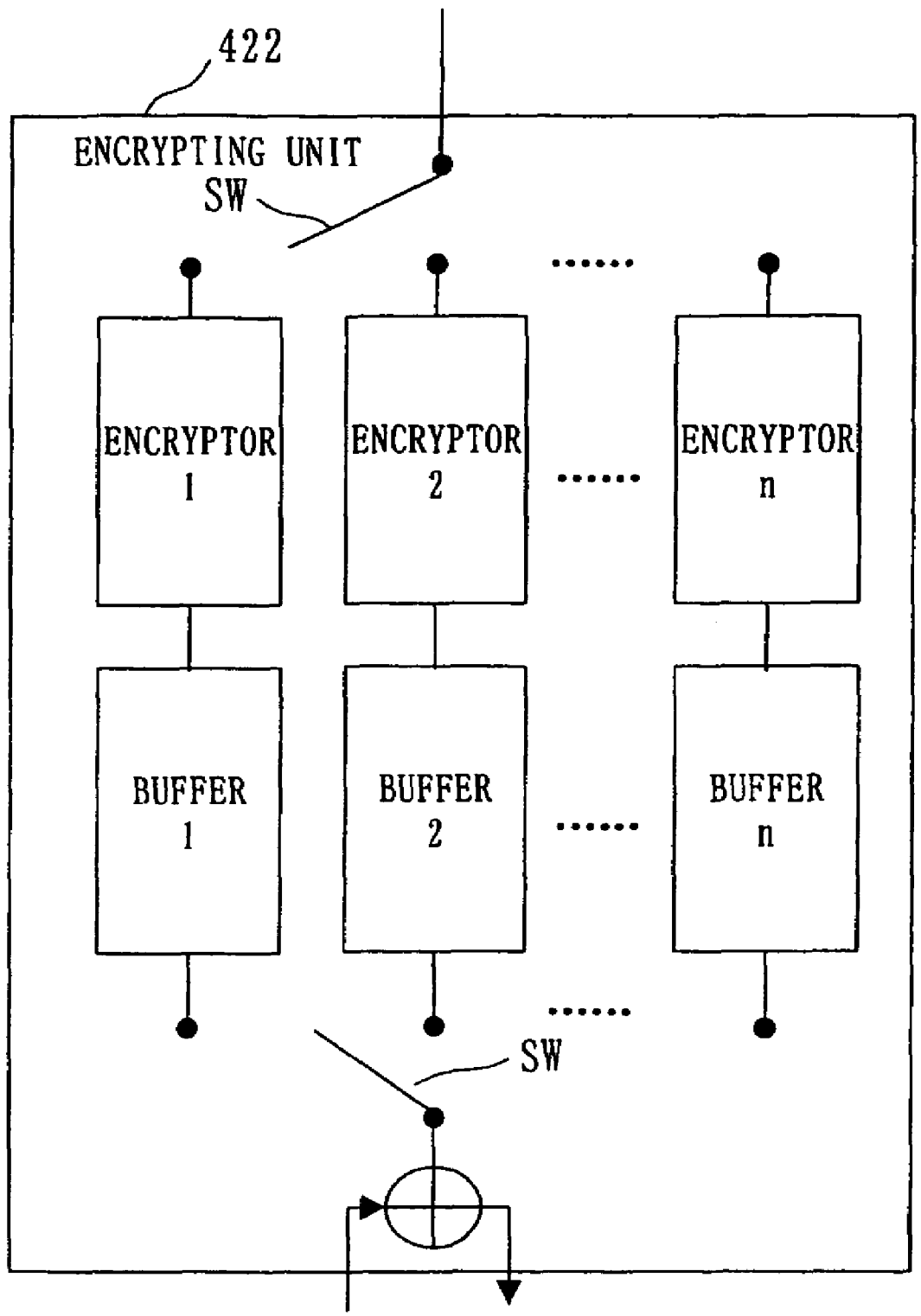
FIG. 35 shows a configuration of the encrypting unit 422 of the third embodiment having multiple buffers.

In case of FIG. 35, n buffers are provided and plural encryptors are provided.

In this way, by providing plural buffers for respective logical channels, the confidentiality processing for each channel can be performed at a high speed.

The decrypting unit can be configured to have plural buffers for respective channels like the cases of FIGS. 33, 34, and 35, which is not illustrated. Further, the message authentication code appending unit 432 and the integrity verification unit 433 can be provided with plural buffers for respective channels like the cases of FIGS. 33, 34, and 35.

The configuration of the third embodiment is not limited to the one shown in FIG. 27, and the configuration can be like such as ones as shown in FIGS. 4, 5, 6, 7, 8, 10, 11, etc. For example, the confidentiality processing and the integrity processing can be performed by one module as shown in FIG. 4. The encryption and the decryption can be performed by one module. Further, the appending of the message authentication code and the integrity verification can be performed by one module. Yet further, each module can be plural.

The buffers 620, 621, 660, and 661 are not limited to the FIFO memories, but they can be shift memories, address mapped memories, cache memories, or registers.

When the CPU 29 accesses the buffers 620, 621, 660, and 661, such access can be performed using memory addresses or input/output addresses.

The encrypting apparatus, the decrypting apparatus, the message authentication code adding unit (apparatus), the integrity verification unit (apparatus), and the message authentication code generating unit (apparatus), which have been explained in the third embodiment, are not limited to ones used for the radio communication apparatus, but they can be employed within a wired communication apparatus, a computer, or other electronic devices.

The above confidentiality/integrity processing unit 40 can be configured by the hardware. For example, the configuration can be implemented by FPGA or custom LSI. Further, the confidentiality/integrity processing unit 40 can be implemented by the software program. In case the confidentiality/integrity processing unit 40 is implemented by the software program, CPU of the radio communication control unit 20 executes the software program.

Further, the confidentiality/integrity processing unit 40 can be implemented by a combination of the hardware and the software. For example, the confidentiality/integrity processing unit 40 can be implemented by DSP (Digital Signal Processor) and micro program or firmware program executed by the DSP.

Hereinafter, a concrete example will be explained with reference to FIGS. 17 through 20.

Figure 17:
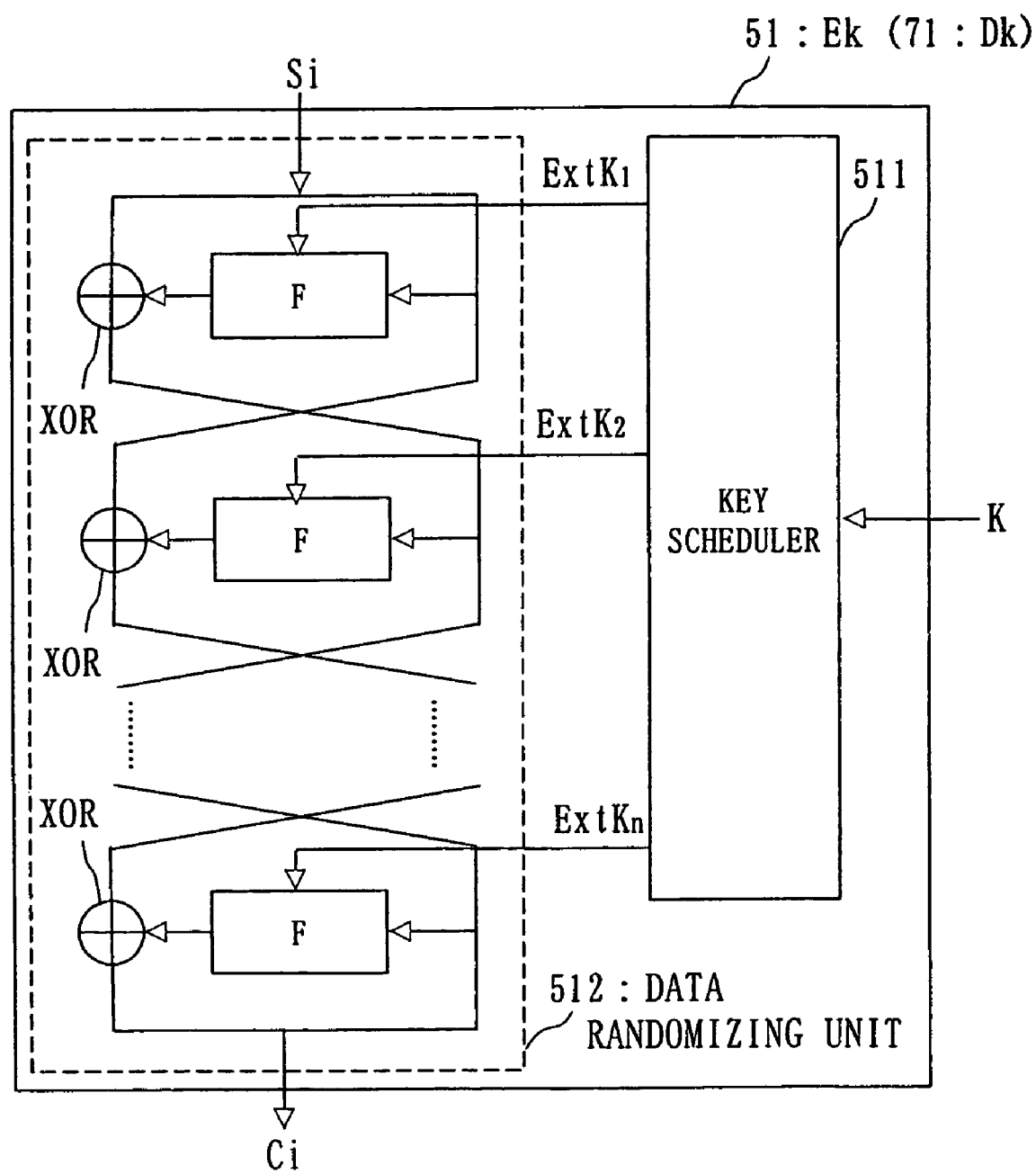
FIG. 17 shows a configuration of an encrypting module 51 (or a decrypting module 71) employed within a encrypting/decrypting 421.

FIG. 17 shows a configuration of the encryption module 51 (or decryption module 71) used for the encryption/decrypting unit 421.

The encryption module 51 includes a key scheduler 511 and a data randomizing unit 512. The key scheduler 511 inputs one key K and generates n extended keys ExtK1 through ExtKn. The data randomizing unit 512 generates a random number using a function F and an XOR circuit. The function F inputs the extended key and performs non-linear data transformation.

In the encryption module 51, various block cipher algorithm can be employed such as:
(1) DES (Data Encryption Standard);
(2) MISTY, which is the block cipher algorithm disclosed in the International Publication No. WO97/9705 (U.S. Ser. No. 08/83640);
(3) KASUMI, which is the 64-bit block cipher technique based on the above block cipher algorithm MISTY and is determined to be employed as International standard cipher for next generation cellular phone (IMT2000); and
(4) Camellia, which is the block cipher algorithm disclosed in the Japanese patent application No. 2000-64614 (filed on Mar. 9, 2000). Further, these block cipher algorithms such as DES, MISTY, KASUMI, and Camellia can be employed in the decryption module 71.

Figure 18:
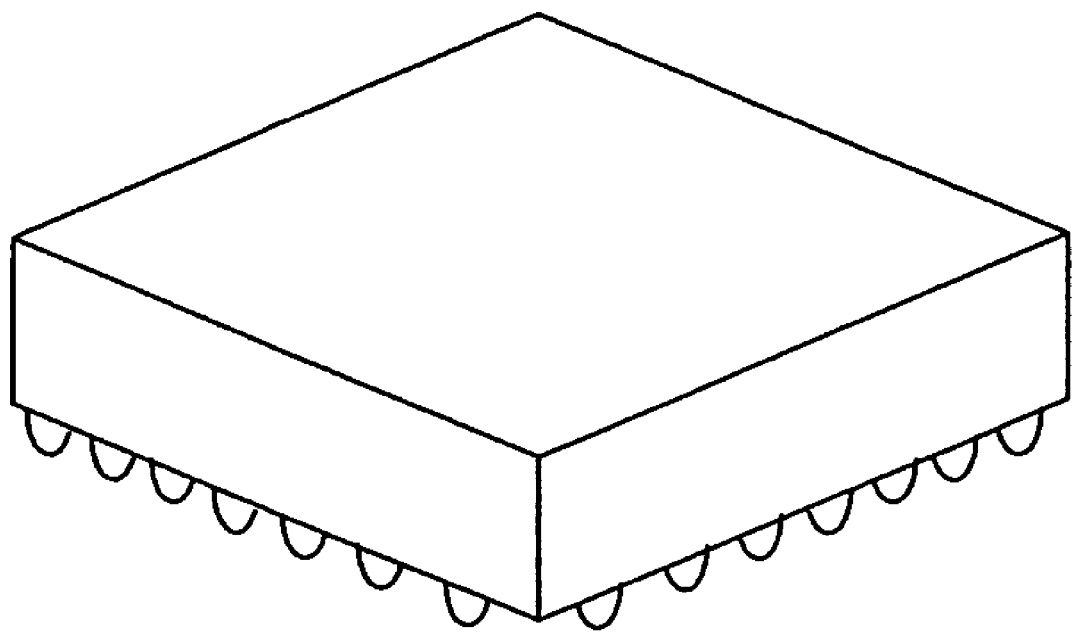
FIG. 18 shows an installing form of the confidentiality/integrity processing unit 40.

FIG. 18 shows the implementation form of the confidentiality/integrity processing unit 40.

FIG. 18 shows a case in which the confidentiality/integrity processing unit 40 is implemented inside FPGA, IC or LSI. Namely, the confidentiality/integrity processing unit 40 can be implemented by the hardware. Further, the confidentiality/integrity processing unit 40 can be also implemented by a print circuit board, which is not shown in the figure.

Figure 19:
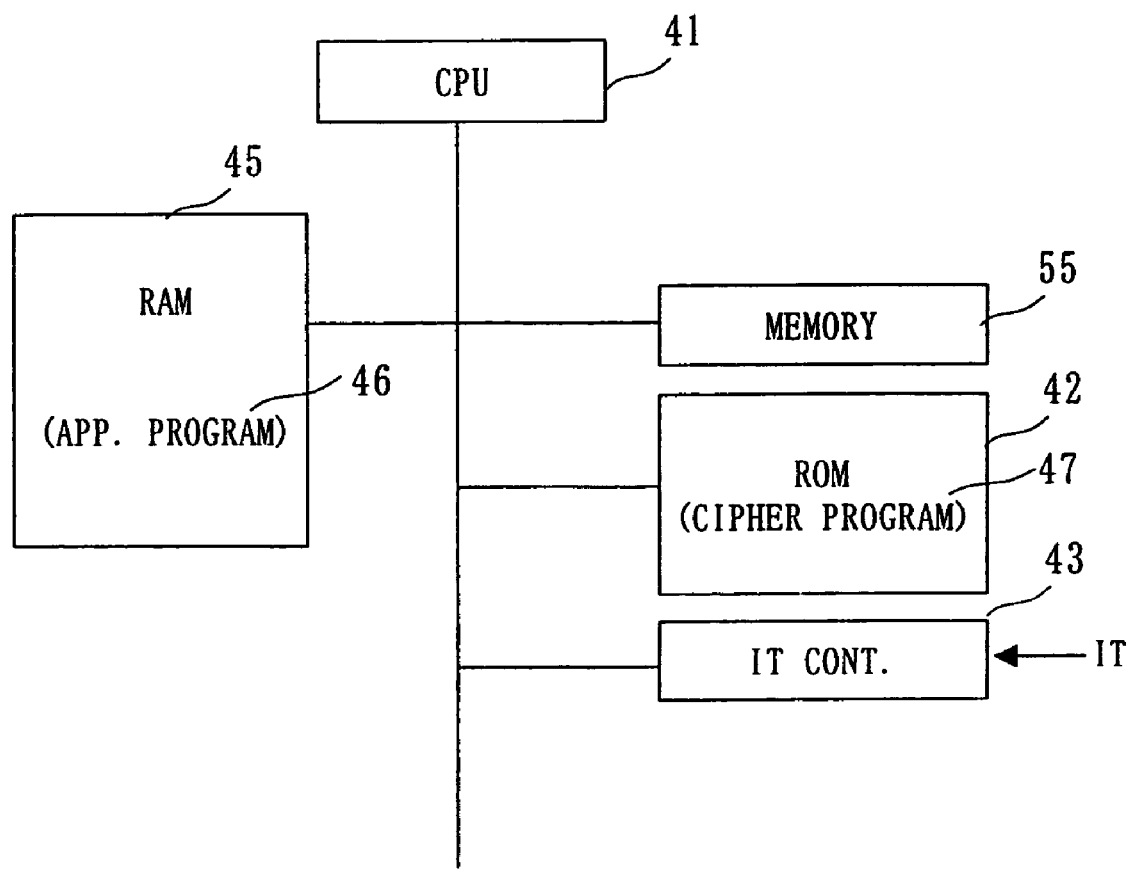
FIG. 19 shows a case in which the confidentiality/integrity processing unit 40 is implemented by software.

FIG. 19 shows a case in which the confidentiality/integrity processing unit 40 is implemented by the software.

The confidentiality/integrity processing unit 40 can be implemented by a cipher program 47. The cipher program 47 is stored in a ROM (Read Only Memory) 42 (an example of storage). The cipher program 47 can be stored in a RAM (Random Access Memory) or another storage such as a flexible disk or a fixed disk. Further, the cipher program 47 can be downloaded from a server computer. The cipher program 47 is functioned as a subroutine. The cipher program 47 is called for subroutine execution from an application program 46 stored in the RAM 45 as a subroutine call. In another way, the cipher program 47 can be activated by generation of an interrupt received at an interrupt control unit 43. A memory 55 can be a part of the RAM 45. The application program 46 and the cipher program 47 are programs executed by the CPU 41.

Figure 20:
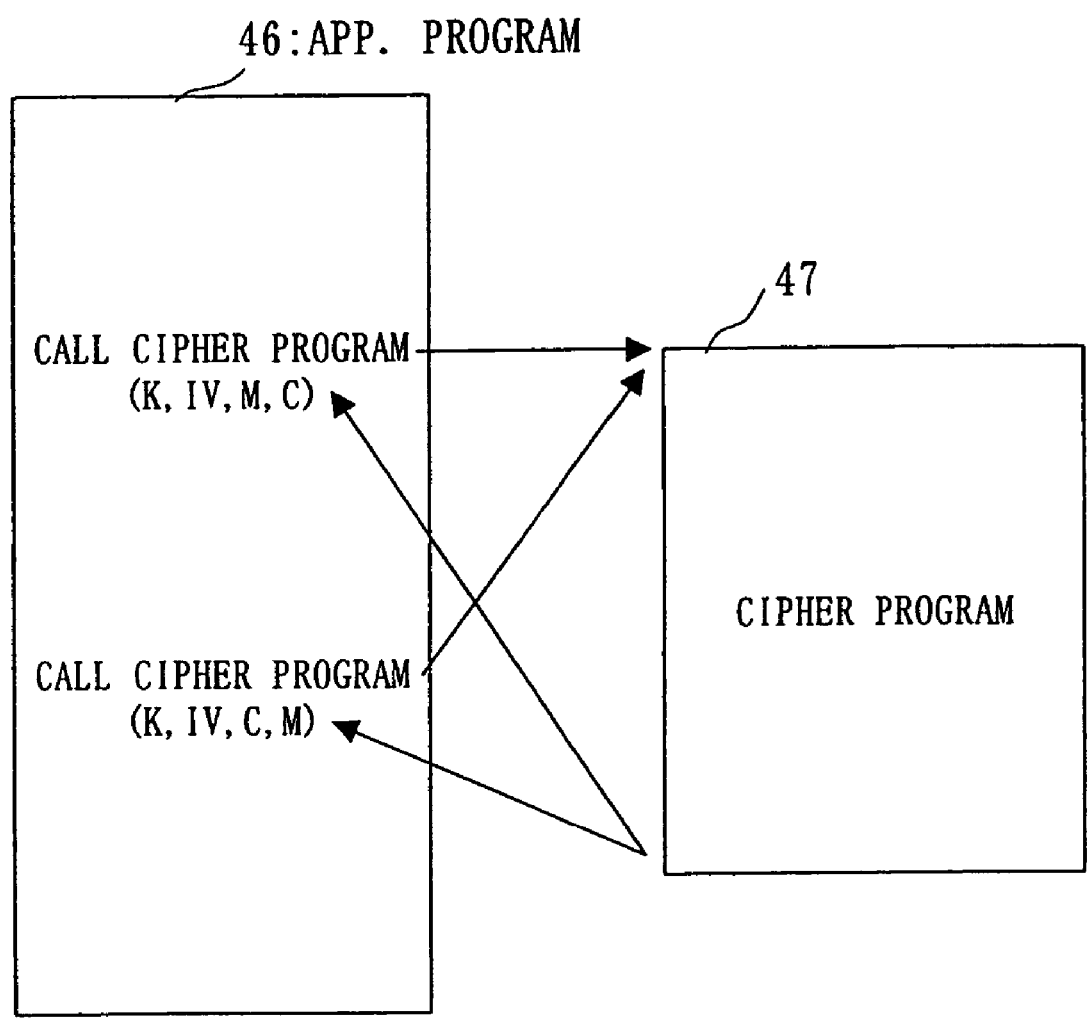
FIG. 20 shows a mechanism for calling cipher program 47 by an application program executed in a radio communication control unit 20.

FIG. 20 shows mechanism for calling the cipher program 47 by the application program 46 which is operated on the radio communication control unit 20.

The application program 46 calls the cipher program 47 using parameters of a key K, an initial value IV, plaintext data M, and ciphertext data C. The cipher program 47 inputs the key K, the initial value IV, and the plaintext data M and returns the ciphertext data C. If the cipher program 47 and the decryption program are the same, the cipher program 47 is called using parameters of the key K, the initial value IV, the ciphertext data C, and the plaintext data M.

Further, the cipher program 47 can be implemented by a digital signal processor and a program read and executed by the digital signal processor, though which is not shown in the figure. Namely, the cipher program 47 can be implemented by combination of the hardware and the software.

The above explanation referring to FIGS. 18, 19, and 20 applies to the encryption, however, the decryption can be implemented in the same way.

The encryption system or the decryption system can be installed to an electronic devices. The system can be installed in all kinds of electronic devices, for example, a personal computer, facsimile machine, a cellular phone, a video camera, a digital camera, or a TV camera. In particular, the feature of the embodiment can be accomplished effectively when the data from multiple channels is encrypted/decrypted. Or the implementation of the embodiment can be effective in case where data is received at random from multiple users and decrypted, or data for multiple users is generated at random and respectively encrypted in real time. Namely, the encryption/decryption of the above embodiment can be extremely effective when the number of apparatuses for encryption/decryption is small compared with the number of data kinds to be encrypted/decrypted. For example, the encryption/decryption of the above embodiment is highly effective when applied to a server computer which has to support many client computers or a base station or a line control unit which has to collect and distribute data from/to many cellular phones.

In the above example, the radio communication control unit 20 and the confidentiality/integrity processing unit 40 are connected with the parallel interface through the bus, however, the serial interface can be used for connecting the radio communication control unit 20 and the confidentiality/integrity processing unit 40. Further, in the above explanation, the terminal IF unit 10 and the confidentiality/integrity processing unit 40, the 30 and the confidentiality/integrity processing unit 40 are connected with the serial interface, however, the parallel interface can be used for processing at a higher speed instead of the serial interface.

In case of FIGS. 9 and 10, the confidentiality processing unit 460 is provided inside the confidentiality/integrity processing unit 40, however, the confidentiality processing unit 460 can be provided independently from the confidentiality/integrity processing unit 40, and the confidentiality processing unit 460 can be placed between the terminal IF unit 10 and the radio communication unit 30.

INDUSTRIAL APPLICABILITY

As has been described, according to the foregoing embodiments, plural pieces of data are previously stored in the buffer, which enables to perform the confidentiality processing and the integrity processing at a high speed.

Further, the number of data transfers can be reduced for the confidentiality processing and the integrity processing, which also reduces the load of the CPU and the bus.

Further, according to the above embodiment, multiple confidentiality processing units and multiple integrity processing units are provided inside the confidentiality/integrity processing unit according to the number of channels or the amount of the data, enabling high speed data processing by the simultaneous parallel processing.

The invention claimed is:

1. An encrypting apparatus comprising:
a central processing unit for inputting and outputting a control signal to be used for generating a random number sequence and plaintext data;
an encryptor for inputting the control signal from the central processing unit and generating the random number sequence based on the control signal;
a random number sequence memory for storing the random number sequence generated by the encryptor; and
an operating unit for inputting the plaintext data from the central processing unit, performing an operation of the plaintext data input and the random number sequence stored in the random number sequence memory and outputting ciphertext data,
wherein the central processing unit outputs the control signal before outputting the plaintext data, and the encryptor starts generation of the random number sequence before the plaintext data is input into the operating unit, and
wherein the central processing unit first starts the generation of the random number sequence by the encryptor and memorization of the random number sequence by the random number sequence memory and then starts the operation of the plaintext data and the random number sequence by the operating unit, before performing the generation of the random number sequence by the encryptor, the memorization of the random number sequence by the random number sequence memory, and the operation of the plaintext data and the random number sequence by the operating unit in parallel.

2. The encrypting apparatus of claim 1,
wherein the encryptor inputs at least an encryption key and a length of the plaintext data, generates the random number sequence having the length of the plaintext data using the encryption key, and makes the random number sequence memory store the random number sequence generated, and
wherein the random number sequence memory includes a buffer for outputting the random number sequence stored in case that the operating unit inputs the plaintext data.

3. The encrypting apparatus of claim 1, wherein:
the operating unit inputs the plaintext data corresponding to plural channels;
the encryptor inputs channel identifying information for identifying a channel and generates the random number sequence for each of the plural channels;
the random number sequence memory stores the random number sequence generated by the encryptor for each of the plural channels; and
the operating unit inputs the random number sequence corresponding to each of the plural channels from which the plaintext data is input and encrypts the plaintext data.

4. A decrypting apparatus comprising:
a central processing unit for inputting and outputting a control signal to be used for generating a random number sequence and ciphertext data, a decryptor for inputting the control signal from the central processing unit and generating the random number sequence based on the control signal;

a random number sequence memory for storing the random number sequence generated by the decryptor; and an operating unit for inputting ciphertext data, performing an operation of the ciphertext data input and the random number sequence stored in the random number sequence memory, and outputting plaintext data, wherein the central processing unit outputs the control signal before outputting the ciphertext data, and the decryptor starts generation of the random number sequence before inputting the plaintext data into the operating unit, and wherein the central processing unit first starts generation of the random number sequence by the decryptor and memorization of the random number sequence by the random number sequence memory and then starts the operation of the ciphertext data and the random number sequence by the operating unit, before performing the generation of the random number sequence by the decryptor, the memorization of the random number sequence by the random number sequence memory, and the operation of the plaintext data and the random number sequence by the operating unit in parallel.

5. The decrypting apparatus of claim 4, wherein the decryptor inputs at least a decryption key and a length of the ciphertext data, generates the random number sequence having the length of the ciphertext data using the decryption key, and makes the random number sequence memory store the random number sequence generated, and wherein the random number sequence memory includes a buffer for outputting the random number sequence stored in case that the operating unit inputs the ciphertext data.

6. The decrypting apparatus of claim 4, wherein:

the operating unit inputs the ciphertext data corresponding to plural channels;

the decryptor inputs channel identifying information for identifying a channel and generates the random number sequence for each of the plural channels;

the random number sequence memory stores the random number sequence generated by the decryptor for each of the plural channels; and the operating unit inputs the random number sequence corresponding to each of the channels from which the ciphertext data is input and decrypts the ciphertext data.

* * * * *